United States Patent [19]
Yandrofski et al.

[11] Patent Number: 5,721,194
[45] Date of Patent: Feb. 24, 1998

[54] TUNEABLE MICROWAVE DEVICES INCLUDING FRINGE EFFECT CAPACITOR INCORPORATING FERROELECTRIC FILMS

[75] Inventors: Robert M. Yandrofski, Littleton; John Charles Price; Frank Barnes, both of Boulder; Allen M. Hermann, Golden; James Floyd Scott, Boulder, all of Colo.

[73] Assignees: Superconducting Core Technologies, Inc., Denver; University Research Corporation, Boulder, both of Colo.

[21] Appl. No.: 480,164

[22] Filed: Jun. 7, 1995

Related U.S. Application Data

[62] Division of Ser. No. 983,632, Dec. 1, 1992, Pat. No. 5,472,935.
[51] Int. Cl.$^6$ .............................. H01B 12/02; H01G 7/06
[52] U.S. Cl. .................. 505/210; 505/700; 505/701; 505/866; 333/74 C; 333/99 S; 361/281; 361/321.1
[58] Field of Search ................... 333/24 C, 161, 333/99 S; 361/277, 281, 322, 321.1; 505/210, 700, 701, 866

[56] References Cited

U.S. PATENT DOCUMENTS

| | | | |
|---|---|---|---|
| 3,365,400 | 1/1968 | Pulvari | 361/281 |
| 3,569,795 | 3/1971 | Gikow | 361/321.1 X |
| 3,784,937 | 1/1974 | Jackson et al. | 333/24 C |
| 4,161,766 | 7/1979 | Castleberry et al. | 361/281 X |
| 4,837,536 | 6/1989 | Honjo | 333/247 |
| 5,070,241 | 12/1991 | Jack | 250/336.2 |
| 5,105,200 | 4/1992 | Koepf | 343/700 MS |
| 5,142,437 | 8/1992 | Kammerdiner et al. | 361/321.1 |
| 5,146,299 | 9/1992 | Lampe et al. | 361/321.1 |
| 5,208,213 | 5/1993 | Ruby | 505/1 |
| 5,212,463 | 5/1993 | Babbitt et al. | 333/161 |
| 5,307,033 | 4/1994 | Koscica et al. | 333/161 |
| 5,409,889 | 4/1995 | Das | 505/210 |

FOREIGN PATENT DOCUMENTS

| | | |
|---|---|---|
| 0193816 | 2/1990 | Japan . |
| 0205904 | 9/1991 | Japan . |
| 1177869A | 9/1985 | U.S.S.R. . |
| 1224868A | 4/1986 | U.S.S.R. . |
| 1352562A | 11/1987 | U.S.S.R. . |

OTHER PUBLICATIONS

Ramesh, et al., "Feuoelectric $PbZr_{0.2}Ti_{0.2}Ti_{0.8}O_3$ Thin Films on Epitaxial Y–Ba–Cu–O" (Oct. 5, 1991).

McAvoy, et al., "Superconducting Stripline Resonator Performance" Proc. 1988 Applied Superconductivity Conf.

Jackson, et al., "A High Temperature Superconductor Phase Shifter", Dec. 1992, Microwave Journal.

Bowling et al., "Radiation Efficiency Measurements of a Thin–Film Y–Ba–Cu–O Superconducting Half–Loop Antenna at 500 Mhz", IEEE, No Month, 1991, pp. 1243–1246.

Takemoto et al., "Microstrip Resonators and Filters using High–TC Superconducting Thin Films on $LaAlO_3$", IEEE No Month, 1991, pp. 2549–2552.

Kobayashi et al., "Monolithic HTS Microwave Phase Shifter and Other Devices", No Month, 1992, pp. 419–424.

White et al., United States Statutory Invention Registration No. H1079, filed Feb. 25, 1992, Published Jul. 07, 1992.

(List continued on next page.)

*Primary Examiner*—Benny T. Lee
*Attorney, Agent, or Firm*—Sheridan Ross P.C.

[57] ABSTRACT

The present invention relates to a tuneable fringe effect capacitor for conducting radio frequency energy. The capacitor includes a thin film of ferroelectric material, a pair of films of a conductive material deposited on the ferroelectric film with a gap between the films, and a substrate for the ferroelectric material and the conductive films. The capacitance value across the gap is varied by applying a voltage to the ferroelectric material and thereby altering the dielectric constant of the ferroelectric material.

23 Claims, 20 Drawing Sheets

OTHER PUBLICATIONS

Jackson et al., Novel Monolithic Phase Shifter Combining Ferroelectrics And High Temperature Superconductors, Microwave And Optical Technology Letters, vol. 5, Nov. 14, Dec. 20, 1992.

Takemoto–Kobayashi, et al., Monolithic High–Tc Superconducting Phase Shifter at 10 GHz, 1992 IEEE MTT–S Digest.

Jackson et al., Monolithic HTS Microwave Phase Shifter and Other Devices, Journal of Superconductivity, vol. 5, Nov. 4, 1992.

Walkenhorst et al., Dielectric properties of $SrTiO_3$ thin films used in high $T_c$ Superconducting Field–Effect Devices, Appl. Phys. Lett. 60 (14), 6 Apr. 1992, American Institute of Physics.

Varadan et al., Ceramic Phase Shifters For Electronically Steerable Antenna Systems, Microwave Journal, Jan. 1992.

Dinger et al., A Survey of Possible Passive Antenna Applications of High–Temperature Superconductors, IEEE Transactions on Microwave Theory and Techniques, vol. 39, Nov. 9, Sep. 1991.

Dinger et al., Radiation Efficiency Measurements of a Thin–Film Y–Ba–CU–O Superconducting Half–Loop Antenna at 500 MHZ, 1991 IEEE MTT–S Digest.

Track et al., Investigation of an Electronically Tuned 100 GHz Superconducting Phase Shifter, 1991 IEEE.

Ryan, Paul A., High–Temperature Superconductivity for EW and Microwave Systems, Journal of Electronic Defense, May 1990.

Das, S.N., Ferroelectrics For Time Delay Steering Of An Array, Ferroelectrics, 1973, vol. 5.

Scott et al., Microstructure–Induced Schottky Barrier Effects in Barium Strontium Titanate (BST) Thin Films For 16 and 64 MBIT Dram Cells, Sep. 1992 IEEE.

TUNEABLE MICROWAVE DEVICES INCLUDING FRINGE EFFECT CAPACITOR INCORPORATING FERROELECTRIC FILMS

This is a divisional of application Ser. No. 07/983,632, filed Dec. 1, 1992, (now U.S. Pat. No. 5,472,935)

BACKGROUND OF THE INVENTION

1. Field of the Invention

Ferroelectric films such as $SrTiO_3$, $Pb(Sr,Ti)O_3$, $Sr_xBa_{1-x}TiO_3$ where $0 \leq x \leq 1$, etc. provide a means for producing tuneable capacitors since the dielectric constant of the ferroelectric films is tuneable by variation of voltage applied to the ferroelectric films. Because of their intrinsically low losses at high frequencies, these materials can be implemented in a variety of microwave components, including delay lines and phase shifters.

One of the principle applications of delay lines and phase shifters is for phased array antennas. The voltage-controlled ferroelectric film modulates the dielectric constant and hence the time delay of either microstrip or coplanar delay lines. Such phase shifters or tuneable delay lines can be used to phase delay microwave and millimeter wave signals either transmitted or received from the individual radiative elements of the antenna array.

Such tuneable ferroelectric films can be used in a large family of tuneable microwave components and devices such as phase shifters, matching networks, oscillators, filters, resonators, loop antennas, superconducting film elements, etc.

2. Description of the Prior Art

Ferroelectric phase shifters are disclosed in "Ceramic Phase Shifters for Electronically Steerable Antenna Systems", Varadan, V. K., et al., Microwave Journal, January 1992, pp. 116–126.

The use of superconductors for microwave frequency transmission is disclosed in "High-Temperature Superconductivity for EW" Ryan, P. A., Journal of Electronic Defense, August 1992, pp. 48–54.

The dielectric properties of thin films of $SrTiO_3$ used as dielectric layers in superconducting field effect (FET) like devices is disclosed in "Dielectric properties of $SrTiO_3$ thin films used in high $T_c$ superconducting field-effect devices", Walkenhourst, A., et al. Appl. Phys. Lett. 60(14), 6 Apr. 1992, pp. 1744–1746.

A superconductor phase shifter using SQUIDS is disclosed in "Monolithic HTS Microwave. Phase Shifter and Other Devices", Jackson C. M. et al. Journal of Superconductivity, Vol. 5 No. 4, 1992, pp. 419–424.

The use of superconductive feed networks and antenna elements of antenna arrays is disclosed in "A Survey of Possible Passive Antenna Applications of High-Temperature Superconductors", Dinger R. J., et al. IEEE Transactions on Microwave Theory and Techniques, Vol. 39, No. 9, September, 1991.

A thin superconducting film antenna is disclosed in "Radiation Efficiency Measurements of a Thin-Film Y—Ba—Cu—O Superconducting Half-Loop Antenna at 500 MHZ", Dinger, R. J., et al. Paper Presented at MTT-S, Boston, June, 1991, pp. 1–4.

The dielectric properties of BST material thin films are disclosed in "Microstructure-Induced Schottky Barrier Effects", in Barium Strontium Titanate (BST) Thin Films for 16 and 64 MBIT Dram Cells, Scott, J. F., et al., circa 1992.

SUMMARY OF THE INVENTION

The present invention relates to the use of ferroelectric insulating thin films as dielectric layers in superconducting thin film structures for fabrication of microwave and millimeter wave devices which are frequency-tuneable. More particularly, metal oxide ferroelectric and superconducting thin films are used in combination to produce an entire new class of microwave and millimeter wave devices which can be frequency-tuned by the application of voltage bias signals across various portions of the ferroelectric thin films. In such structures, because of the low loss performance of superconductors at high frequency, the microwave and millimeter wave performance of the devices are limited mostly by the loss tangent of the ferroelectric dielectric layers. The fundamental materials compatability of a whole class of metal oxide superconductors with a whole class of metal oxide ferroelectric materials provides a thin film material system with unique flexibility for designing and fabricating a multiplicity of multilayer geometries, including ferroelectric on superconductor structures and superconductor on ferroelectric structures.

The invention is especially useful for producing microwave and millimeter wave devices which have the extreme low loss performance of other superconducting devices, but also have the necessary frequency tuneability required for most practical applications. By this invention, it is possible to realize numerous microwave and millimeter wave devices, including, but not limited to, delay lines, phase shifters, resonators, oscillators, filters, electrically-small antennas, half-loop antennas, directional couplers, patch antennas, and various radiative gratings, which are frequency-tuneable by utilizing voltage-tuneable capacitor structures fabricated from voltage-biased ferroelectric thin films in combination with superconducting thin films.

The invention relates to the utilization of both thin films of high temperature superconductor (HTSC) material and thin films of ferroelectric materials for achieving tuneability in a variety of microwave structures.

Ferroelectric films such as $SrTiO_3$, $Pb(Sr,Ti)O_3$, $Sr_xBa_{1-x}TiO_3$ where $0 \leq x \leq 1$, etc. provide a means for producing tuneable capacitor structures at microwave frequencies since the dielectric constant of the ferroelectric films is tuneable by variation of voltage applied to the ferroelectric films. In accordance with the invention, a thin film of ferroelectric material is provided with a thin film (or films) of a high temperature superconductor (HTSC) such as Y—Ba—Cu—O (YBCO) or Tl—Ba—Ca—Cu—O (TBCCO) in order to produce low loss microwave and millimeter wave devices which are frequency tuneable by application of voltage to the thin films of ferroelectric material. The thin film structures of HTSC material and ferroelectric material which are deposited on a substrate result in reduced losses; limited only by the loss tangent of the ferroelectric material and the impedance matching structures. The combination of HTSC thin films and ferroelectric thin films can be used in a large family of tuneable microwave components and devices such as phase shifter devices which offer a method for obtaining true-time delay, superconducting phase shifters, tuneable delay lines, resonators, filters, matching networks, oscillators and tuneable antennas.

The combination of a HTSC thin film and ferroelectric thin films offers a novel class of microwave devices with unique properties including a substantial frequency tunability, simple construction, the potential for optimization of temperature operation ranges, the ability to use variably thin dielectrics, low cost, high level of integration with other components such as antennas and the increased power handling of the circuit. The extent of the tunability of the structures depends upon the ferroelectric material, its form and geometry, (e.g., film thickness), the temperature, and the applied fields or voltage.

Compatibility of YBCO, TBCCO and other superconductors and a broad class of ferroelectric materials enables the optimization of ferroelectric materials and superconducting materials and the growth of alternating layers of each by a variety of deposition methods including evaporation, sol gel, sputtering physical vapor deposition, chemical vapor deposition, laser deposition and others. The combination of HTSC thin films and ferroelectric films provides a novel class of tuneable microwave and millimeter wave devices.

One of the principle applications of the invention comprises phase shifters and tuneable delay lines for phased array antennas. The voltage-controlled ferroelectric thin film modulates the dielectric constant and hence the time delay, of either microstrip line or coplanar delay lines. Such phase shifters or tuneable delay lines can be used to phase delay microwave and millimeter wave signals either transmitted or received from the individual radiative elements of the antenna array. Other applications of the class of tuneable microwave and millimeter wave devices include resonators, filters, matching networks, oscillators, directional couplers and tuneable antennas.

The invention also includes the utilization of a dielectric grating for an individual radiative element in a phased antenna array. Such a grating (with fixed delay between each adjacent element) radiates (or receives) energy at a fixed angle. The angle can be adjusted by biasing the dielectric grating with a single bias voltage. Such a voltage-controlled grating enables steering (in one direction) with the application of a single DC-bias line.

The invention of the dielectric grating can be extended to two-dimensional arrays, with steering in both the x- and y-directions. A simple two-dimensional array of such gratings with a fixed spacing between each grating "patch" antenna provides a similar fixed radiation angle in the second direction. A second, single voltage bias line modulates the dielectric constant and hence the time delay between each grating structure in the array.

The invention also includes several capacitively coupled devices, including a tuneable superconducting resonator with substantial tunability, a superconducting fringe-effect capacitor with substantial tunability, and application of the tuneable devices to a broad range of resonant devices, including tuneable loop antennas.

DESCRIPTION OF PREFERRED EMBODIMENTS

Figure 1:
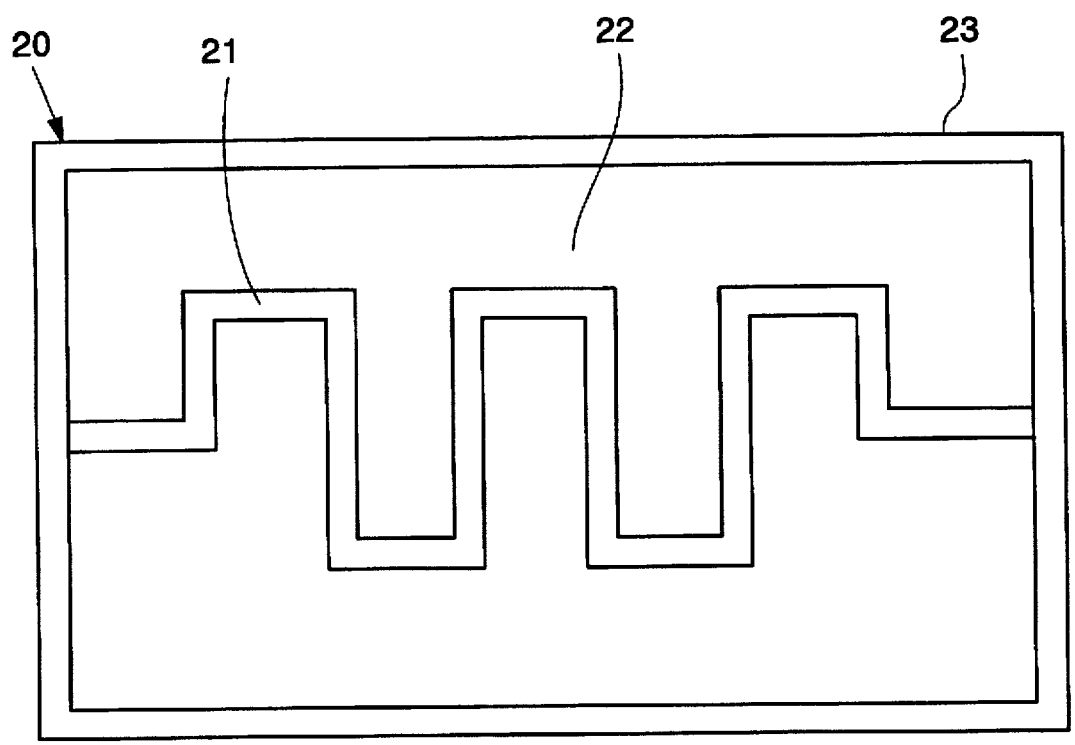
FIG. 1 is a plan view of a specific embodiment of invention, a tuneable delay line, showing a microstrip line of HTSC material deposited on a thin film (substrate) of ferroelectric material, all deposited on a crystalline substrate.

Discoveries of high temperature superconducting (HTSC) materials such as the 30° K. La—Ba—Cu—O superconductor and the 90° K. Y—Ba—Cu—O superconductor have stimulated a worldwide race for higher temperature superconductors. Breakthroughs have been made by the discoveries of the 90° K. Tl—Ba—Cu—O system, the 110° K. Bi—Ca—Sr—Cu—O system, and the 120-K Tl—Ba—Ca—Cu—O (TBCCO) system. The Y—Ba—Cu—O system is the first rare earth system which reaches zero resistance above the liquid nitrogen boiling point while the Tl—Ba—Ca—Cu—O system reaches zero resistance above 100K and has the highest zero-resistance temperature (127° K.).

A number of superconducting phases, including $Tl_2Ba_2Ca_2Cu_3O_{10+x}$ where $-1 \leq x \leq 1$ (2223) and $Tl_2Ba_2Ca_1Cu_2O_{8+x}$ where $-1 \leq x \leq 1$ (2212) have been isolated from the Tl—Ba—Ca—Cu—O system. The 2223 superconductor has a 3.85×3.85×36.25 Å tetragonal unit cell. The 2122 superconductor has a 3.85×3.85×29.55 Å tetragonal unit cell. The 2223 phase is related to 2122 by addition of extra calcium and copper layers. In addition, the superconducting phase in the Ca-free Tl—Ba—Cu—O system is $Tl_2Ba_2CuO_{6+x}$ where $-1 \leq x \leq 1$ (2201).

The new class of tuneable microwave devices of the invention combines the low loss of a high temperature superconductive (HTSC) material (such as Tl—Ba—Ca—Cu—O and Y—Ba—Cu—O) in a thin film with the variable dielectric properties of a thin film of ferroelectric material. Ferroelectric thin films such a $SrTiO_3$, $Pb(Sr,Ti)O_3$, $Sr_xBa_{1-x}TiO_3$ where $0 \leq x \leq 1$, etc. provide a means for producing low-loss tuneable capacitor structures at microwave and millimeter wave frequencies since the dielectric constant of the ferroelectric thin films is tuneable by variation of voltage applied to the films. A thin film of ferroelectric material is provided with a thin film of a high temperature superconductor (HTSC) material such as Y—Ba—Cu—O or Tl—Ba—Ca—Cu—O. The HTSC thin film results in a multilayer structure with reduced losses, limited only by the loss tangent of the ferroelectric material and the impedance matching structures. The combination of HTSC thin films and ferroelectric films can be used in a large family of tuneable microwave components and devices such as phase shifter devices which offer a method for obtaining true-time delays in tuneable delay lines, tuneable filters, matching networks, oscillators, loop antennas, directional couplers, resonators, etc.

The thin film of ferroelectric material, e.g., $SrTiO_3$ and various barium doped strontium titanate materials provide an excellent substrate for the deposition of an HTSC material such as $YBa_2Cu_3O_{7-\delta}$ (YBCO) or Tl—Ba—Ca—Cu—O (TBCCO). $SrTiO_3$, and its relatives, have a perovskite crystal structure with an excellent lattice match and thermal expansion coefficient close to that of YBCO, Tl—Ba—Ca—Cu—O, and other thallium copper oxide superconductors. In general other substrates can also be used, such as lanthanum aluminate, etc.

The combination of HTSC thin films and ferroelectric thin films offers a novel class of tuneable microwave and millimeter wave devices with unique properties including a substantial frequency tuneability, simple construction, the potential for optimization of temperature operation ranges, the ability to use variably thin dielectrics, low cost, high level of integration with other components such as antennas, and the power handling of the circuit. The extent of the tuneability of the structures depends on the materials, their forms and geometries (e.g. film thickness), the temperature, and the applied voltage.

High quality $SrTiO_3$, $BaSrTiO_3$, $LaAlO_3$, and other dielectric thin films can be deposited on HTSC thin films (e.g., YBCO or Tl—Ba—Ca—Cu—O) films by sol-gel, plasma-spray, sputtering, physical vapor deposition, chemical vapor deposition, laser deposition, and other techniques. Superconducting properties of the HTSC layer depend on the compatability with the ferroelectric thin film and vice-versa, as well as on processing conditions. In practical circuits, a fixed temperature of operation is required to provide good impedance matching. Broadband, compact, low loss, thin-film, superconducting matching circuits are available. A thin film multilayer implementation of the class of tuneable superconducting/ferroelectric structures of the invention has the added benefit that monolithic devices and integrated circuits can be designed.

As shown in FIG. 1, a tuneable delay line 20 is formed by a patterned microstrip line 21 of a thin film of HTSC material, for example YBCO material, deposited on a thin film 22 of ferroelectric material which is deposited on ground plane 23. In turn ground plane 23 is deposited on a crystalline substrate such as $SrTiO_3$ (not shown). The ferroelectric thin film 22 can be, for example, from 100 Å to 10000 Å thickness. By applying a voltage between the superconductor or microstrip line 21 and a ground plane 23, a DC bias is provided to the ferroelectric layer, thereby changing the dielectric constant and the wave propagation velocity within the layer. Note that both the microstrip line and the ground plane can be made from HTSC material.

The microstrip line or pattern 21 of a YBCO thin film is deposited on the $SrTiO_3$ thin film substrate 22 by using sol-gel, chemical vapor deposition, physical vapor deposition, sputtering, laser deposition, or other techniques. Sol-gel deposition and chemical vapor deposition of superconducting thin films and ferroelectric thin films is disclosed in U.S. Pat. Nos. 5,119,760 and 5,138,520, assigned to Symetrix Corporation of Colorado Springs, Colo.

Figure 2:
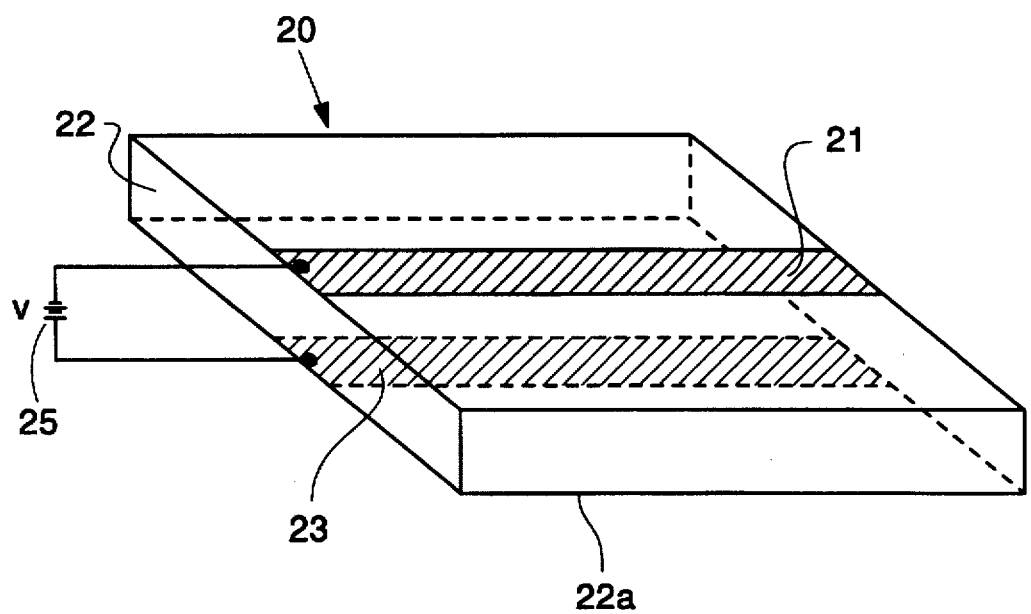
FIG. 2 is a schematic representation of the tuneable superconductor/ferroelectric thin film device of the invention.

FIG. 2 shows a schematic representation of the tuneable delay line 20 including the microstrip line or thin film of the (HTSC) YBCO material 21. A normal metal (e.g. silver) or HTSC material ground plane 23 is deposited on the rear surface 22a of substrate or film 22. Variable voltage source 25 enables a variable voltage $V$ to be applied as an electric field to the ferroelectric layer 22 by means of microstrip line 21 and ground plane 23.

$SrTiO_3$ belongs to the $BaTiO_3$ group in the classification of ferroelectric materials. $BaTiO_3$ is a well known ferroelectric material and its phase transition from cubic to tetragonal, where a small displacement of Ti in the tetragonal phase under the external electric field, is responsible for ferroelectricity. $SrTiO_3$ has three crystalline phase transitions at lower temperatures (see Table 1).

TABLE 1

LOW TEMPERATURE PHASE TRANSITION OF $SrTiO_3$

| TEMPERATURE (K.°) | STABLE PHASE | PHYSICAL CONSTANT |
|---|---|---|
| >110 | cubic | a = 3.902A |
| 65–110 | tetragonal | c/a = 1.00056 |
| 35–65 | orthorhombic | a:b:c = 0.9998:1:1.0002 |
| <10 | Possibly rhombohedral | |

Other ferroelectric materials which can be used for thin film 22 include $BaTiO_3$, $LiNbO_3$, $Pb(Sr,Ti)O_3$, $Sr_xBa_{1-x}TiO_3$ where $0 \leq x \leq 1$ etc. Other materials from the III–V, and II–VI groups could be used with other buffer layers to solve any lattice matching problems which arise should epitaxial deposition be required.

The extent of tuneability of the tuneable delay line 20 depends upon the ferroelectric material, the temperature, and the applied field or voltage.

An advantage of the superconductor/ferroelectric tuneable delay line 20 of the invention is its power handling capability. Distortion can arise in a non-linear transmission line when the RF voltages become comparable to the DC control voltages. The power handling of a microstrip line can be estimated from the minimum bias voltage to be used. Power is given by $P=V^2/Z$ where P=power, V=voltage, and Z=impedance. Accordingly, for a 5 volt bias and a 1 ohm impedance, 25 watts (i.e. >40 dBm) could be handled before the non-linearities become apparent. The level of high power will set the microstrip line width requirement to insure that the critical current carrying capacity of the line is not exceeded.

Figure 3:
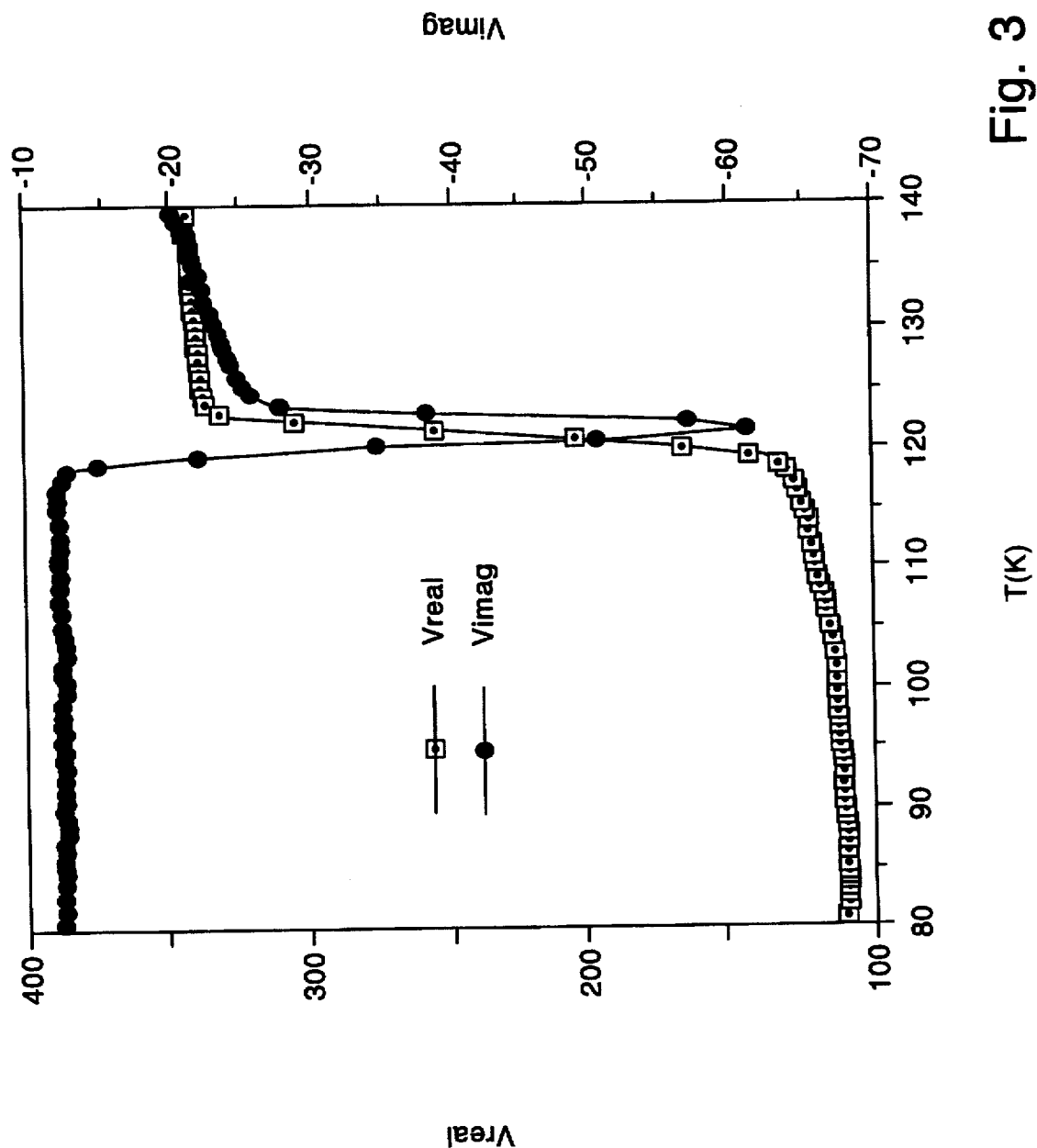
FIG. 3 is a plot of the Magnetic Flux Screening-Temperature characteristic for a multilayer superconductor/ferroelectric thin film structure of the invention after deposition as measured by a mutual inductance technique.

FIG. 3 shows changes in resistance in terms of voltage with changes of temperature of the multilayer superconductor/ferroelectric thin film structure of the invention after deposition. Thus FIG. 3 shows the temperature dependence for a multilayer superconductor/ferroelectric thin film structure. The sharp changes at the superconductor critical temperature are characteristic of a superconductor, indicating that the ferroelectric material deposition and processing does not destroy the properties of the superconducting thin film.

Figure 4:
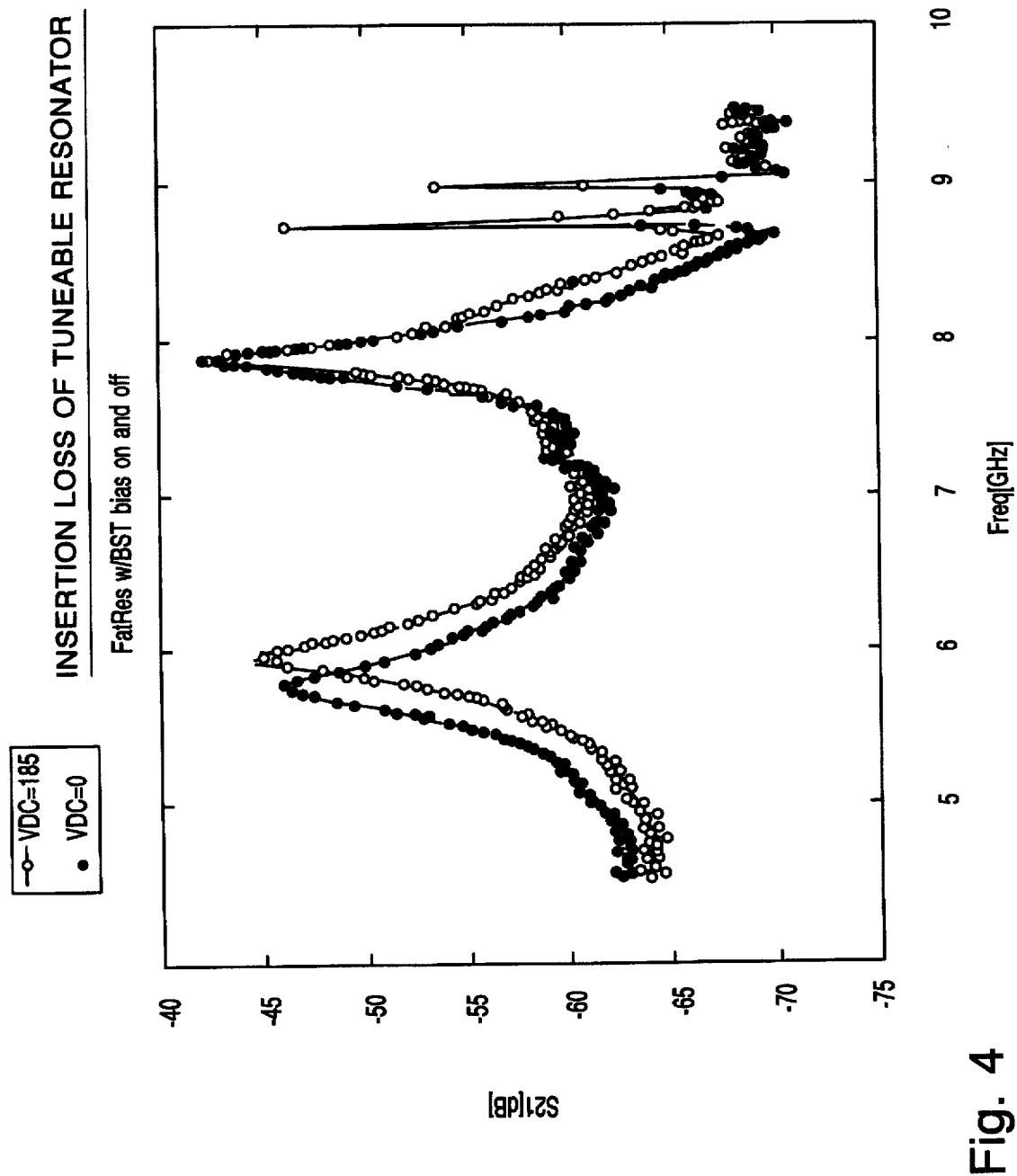
FIG. 4 is a plot of Insertion Loss vs. Frequency at 77 K for the tuneable resonator of the invention.

FIG. 4 shows the change in insertion loss in dB plotted against frequency in GHz at 77° K. for the tuneable resonator of the invention and resonant frequency peaks thereof. The measured frequency response of the resonator circuit as shown in FIG. 4 clearly indicates a shift in frequency of the fundamental resonance and the third harmonic when a biasing voltage is applied to the tuning element.

Figure 5:
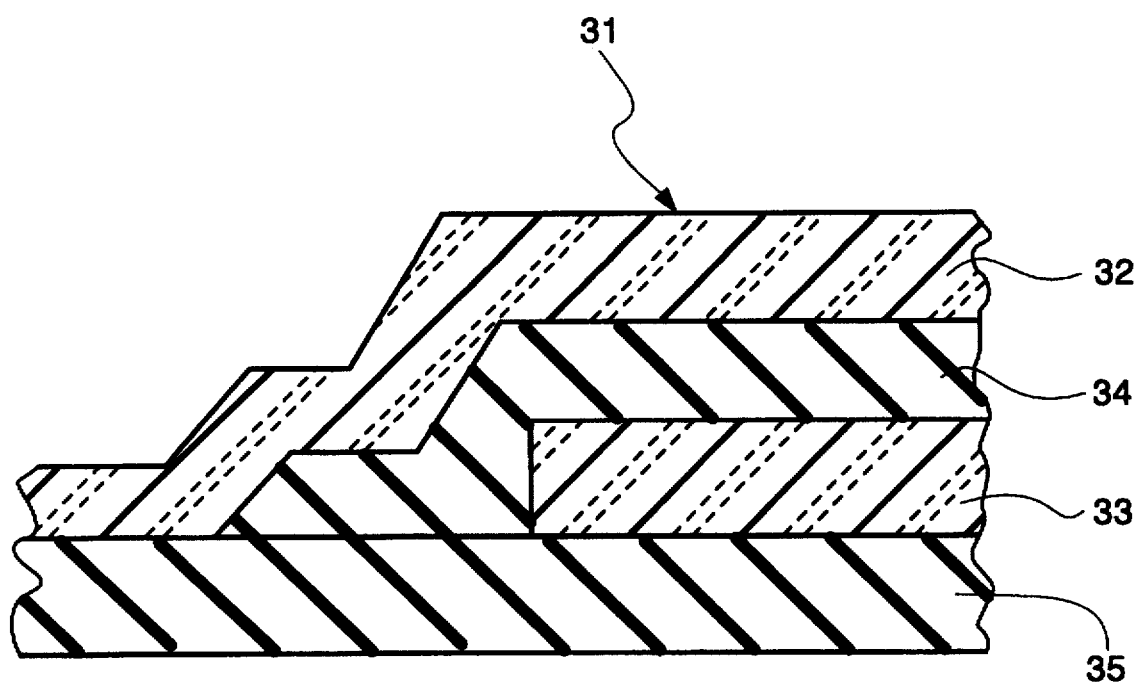
FIG. 5 is a fragmentary vertical section view of a thin film of HTSC material contiguous with the opposite surface of a film of ferroelectric material.

FIG. 5 shows a microstrip line 31 of HTSC material in section. As shown in FIG. 5, the thin film of the HTSC material 32 of microstrip line 31 is deposited upon thin film 34 of the ferroelectric material. Thin film 34 of ferroelectric material is contiguous with thin film 33 of HTSC material. Crystalline substrate 35 supports thin films 33, 34 and 32.

Where size, weight, and drive mechanisms are limited, the traditional moving reflector antenna is being replaced in some applications by phased array antennas. Generally planar in shape, conventional phased array antennas are formed by a substantial number of closely spaced, individual radiators, whose composite beam can be shaped and spacially directed in microseconds, thereby enabling the antenna to track a multitude of targets at one time. This is accomplished electronically by RF phase shifters associated with each individual radiating element. No moving parts are required.

State of the art passive phased array antennas are limited in their application by cost, more than any other factor. The required phase shifters are not cheap and with a typical array requiring thousands of individual antenna elements, each with its own phase shifter, the price of the total system becomes prohibitive.

The principal difficulty of such phased arrays is that for large arrays, i.e. antenna arrays with a large number of radiative elements, the need to control each individual time delay to each radiative element requires that each individual phase shifter be independently voltage-biased. Arrays as large as 100×100 radiative elements necessarily require 10,000 independently-controlled bias voltage lines, which can be prohibitive in complexity and cost.

The ferroelectric phase shifter design is based upon a material whose dielectric permittivity can be made to vary by application of a DC electric field, parallel to the polarization of the RF energy, and normal to its direction of propagation. Variations in permittivity alter the RF propagation velocity, and if connected to a waveguide structure, will change the cutoff wavelength and dispersion of the waveguide itself. These two effects translate into propagation phase variation. A short waveguide section containing a phase shifter of ferroelectric material and HTSC material constitutes the key element for accomplishing electronic scanning in a phased array antenna configuration.

A typical application of the thin film HTSC material and ferroelectric thin film technology of the invention is for phase shifters for phased array antennas. The voltage-controlled ferroelectric thin film can be used to modulate the dielectric constant, and hence the time delay, of either microstrip line or coplanar delay lines. Such phase shifters or tuneable delay lines can be used to phase delay microwave and millimeter wavelength signals either transmitted or received from the individual radiative elements of the antenna array.

Figure 6:
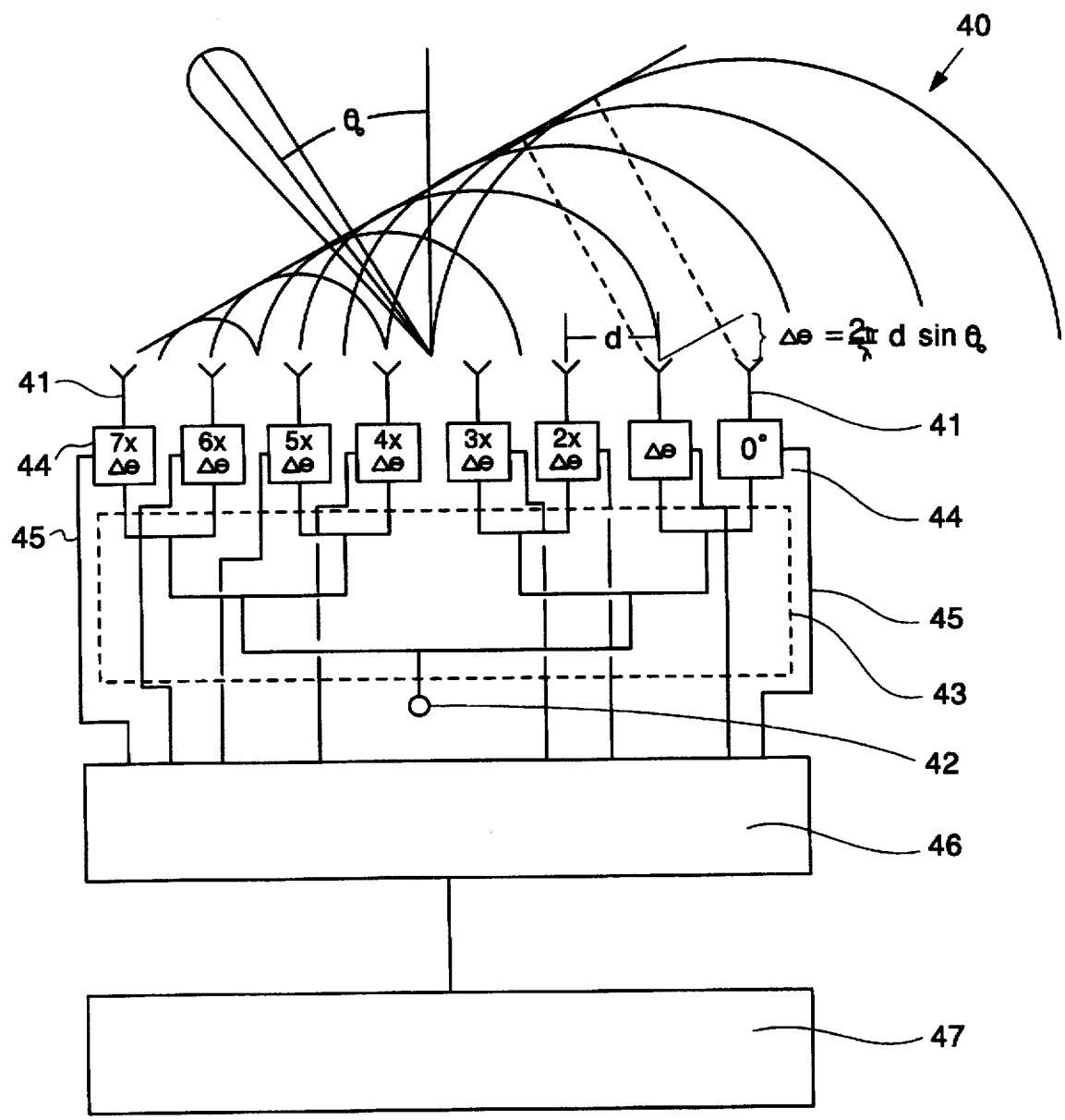
FIG. 6 is a schematic representation of the phase shifter of the invention in a phased array antenna system.

As shown in FIG. 6, the phased array antenna 40 of the invention includes a plurality of radiators 41. The antenna input 42 from a source of a electromagnetic radiation such as that at a microwave frequency is provided with a power distribution network 43. The distribution network connects the antenna input to each of a plurality of phase shifters 44 in accordance with the invention. The thin superconducting film of each of phase shifters 44 is connected by leads 45 to control circuit 46. The control circuit is driven by programmer 47 to control the voltage applied by the thin superconductor film to the ferroelectric film of each of the phase shifters 44. Thus, the dielectric permittivity of the ferroelectric thin film of each of phase shifters 44 can be varied by the application thereto of a variable DC electric field. The DC electric field is applied normal to the direction of propagation of the RF energy and parallel to the polarization of the RF energy being transmitted through the phase shifter to the radiators 41 of phased array antenna 40. Variations in permittivity of the ferroelectric thin film material alter the RF propagation velocity and can change the cutoff wavelength and dispersion of the RF energy being delivered to the radiators 41 of the antenna. As a result there is a variation in the propagation phase of one radiator with respect to another. Thus programmer 47 by means of control circuit 46 can effect electronic scanning of the phase shifters 44 connected to the radiators 41 of antenna 40 and thereby enable the beam produced by antenna 40 to be shaped into a predetermined form and to be directed in microseconds. In this way the RF energy radiated by the antenna can track a multitude of targets at one time. In FIG. 6, $\theta_o$ is the angle of the beam shaped by the phased array antenna with respect to an axis extending at right angles to the line of radiators 41. The interval "d" is the spacing between radiators 41. "λ" is the wavelength of the radiation. "φ" is the phase angle of the radiation from source 47. "Δθ" is the difference in the propagation phase of each of radiators 41 of antenna 40 with respect to the other radiators. "x" of "2x", "3x", "4x", "5x", "6x", and "7x" is a constant applied to "Δθ". As will be appreciated, 0° refers to the fact that the radiator 41 has the reference propagation phase from which the propagation phase difference is measured for the other radiators.

Figure 7:
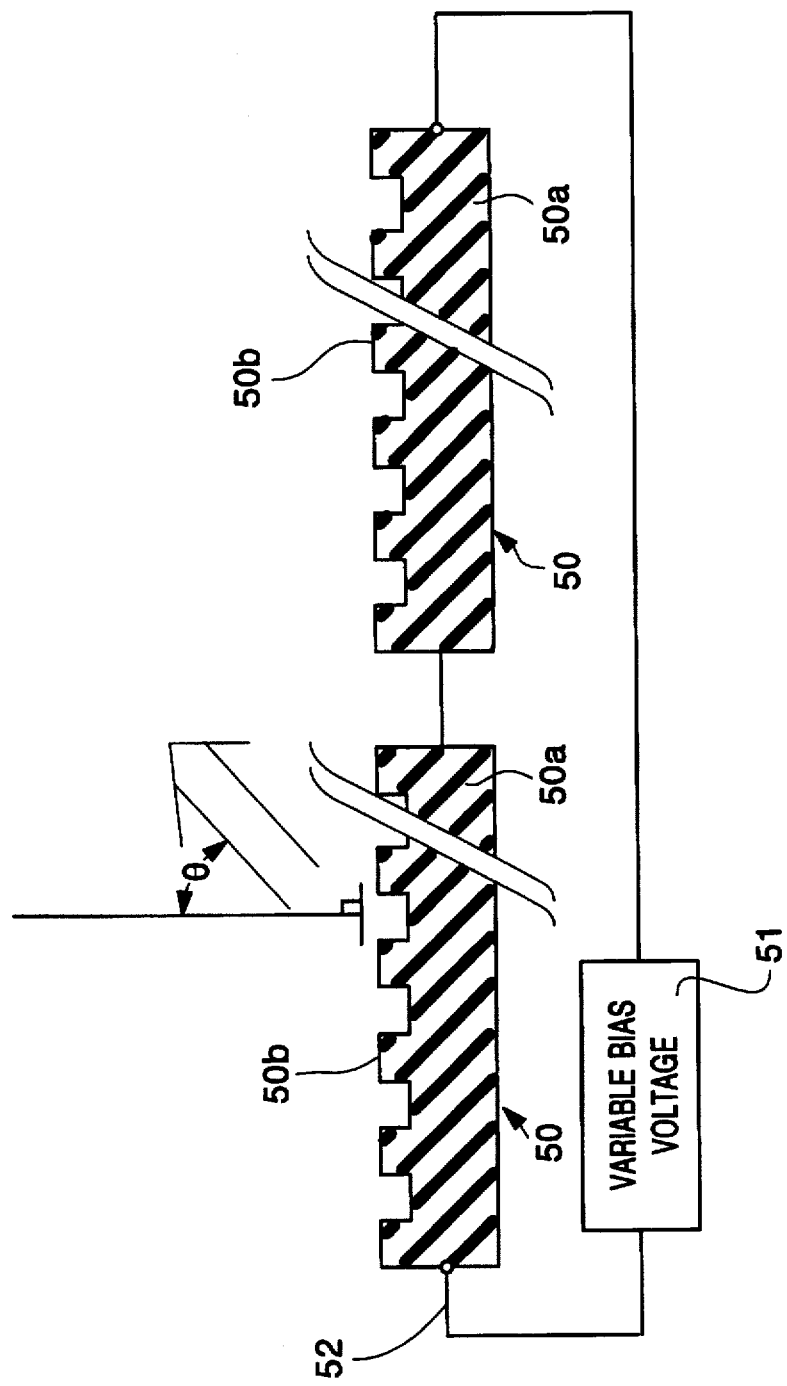
FIG. 7 is a fragmentary vertical section view of a dielectric grating in accordance with the invention for an individual radiative element in an antenna array.

Another embodiment of the invention as shown in FIG. 7 comprises a dielectric grating 50 for an individual radiative element in an antenna array. The grating comprises a base portion 50a and a plurality of elements 50b projecting from base portion 50a and spaced apart from one another. Grating 50 which is formed, for example, of a thin film of ferroelectric material with a fixed time delay determined by the spacing between each adjacent element 50b intrinsically radiates (or receives) RF energy at a fixed angle θ. The angle θ is adjusted by biasing the dielectric grating 50 with a bias voltage from variable bias voltage source 51. Such a voltage-controlled grating enables changing or steering (in one plane) oft he radiation angle θ with the application of a variable bias voltage from the source 51 to the grating 50 by lead 52.

Figure 8:
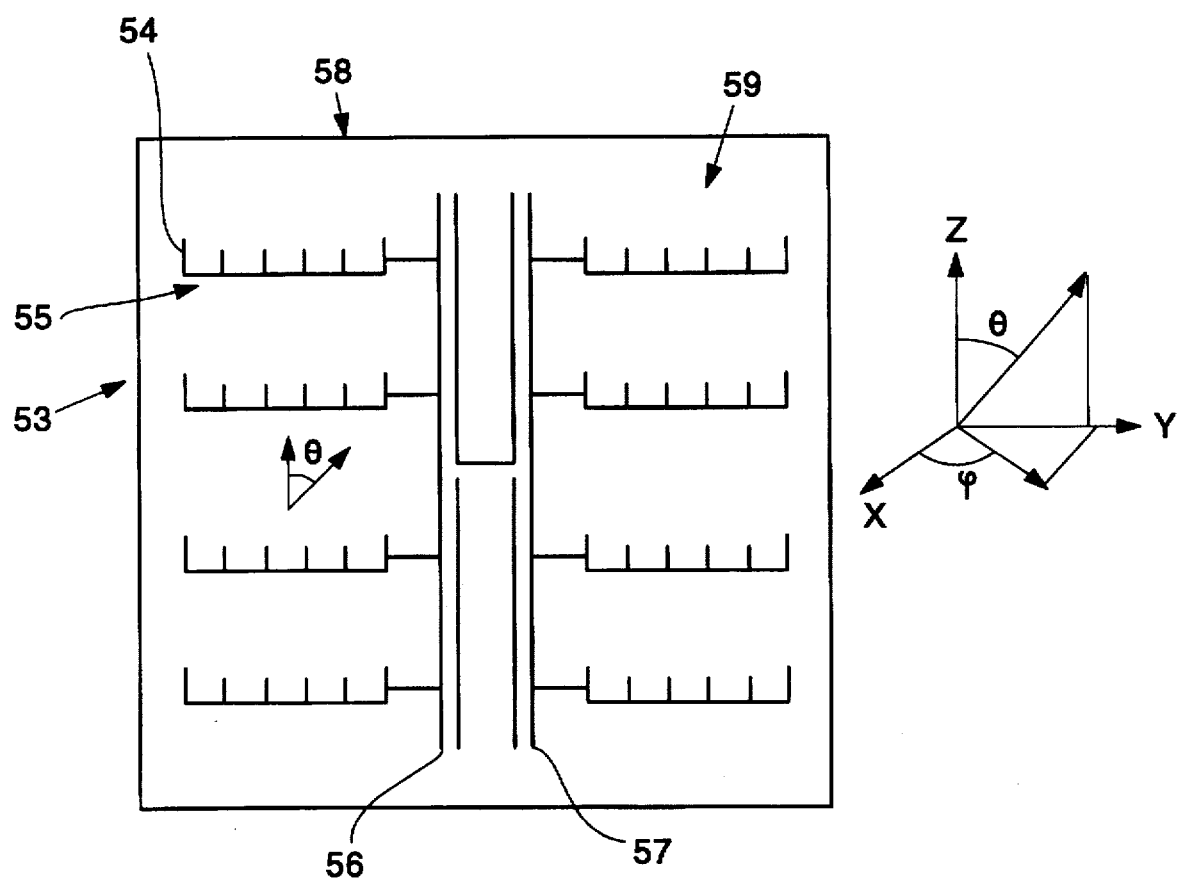
FIG. 8 is a schematic representation of a two-dimensional array of dielectric gratings in accordance with the invention for an antenna array.

In FIG. 8 there is shown a two-dimensional array antenna with steering of the radiation angle θ in both the x–z and y–z planes. A two-dimensional array 53 of gratings 54 is shown in FIG. 8. A fixed spacing between each grating "patch" antenna element 55 formed by a grating 50 as shown in FIG. 7 and provides a similar radiation angle in the second plane. Voltage bias lines 56 and 57 connected to arrays 58 and 59, respectively, modulate the dielectric constant of the gratings and thereby the time delay between each antenna element 55 in the arrays 50 and 59 which make up antenna 53.

The thin film superconductor/ferroelectric technology of the invention can also be used with:

(1) Tuneable cavities and resonators;

(2) Tuneable frequency and wavelength filters;

(3) Ferrite thin film isolators;

(4) Directional coupler switches;

(5) Phase shift feeder networks for patch antennas;

(6) Coplanar lines with variable impedance using voltage-tuned meander lines as the center conductor of the coplanar line;

(7) tuneable resonant antennas;

(8) tuneable electrically small antennas; and (9) Tuneable, one-dimensional confocal (i.e., having the same focus) resonators which can provide higher Q.

Figure 9:
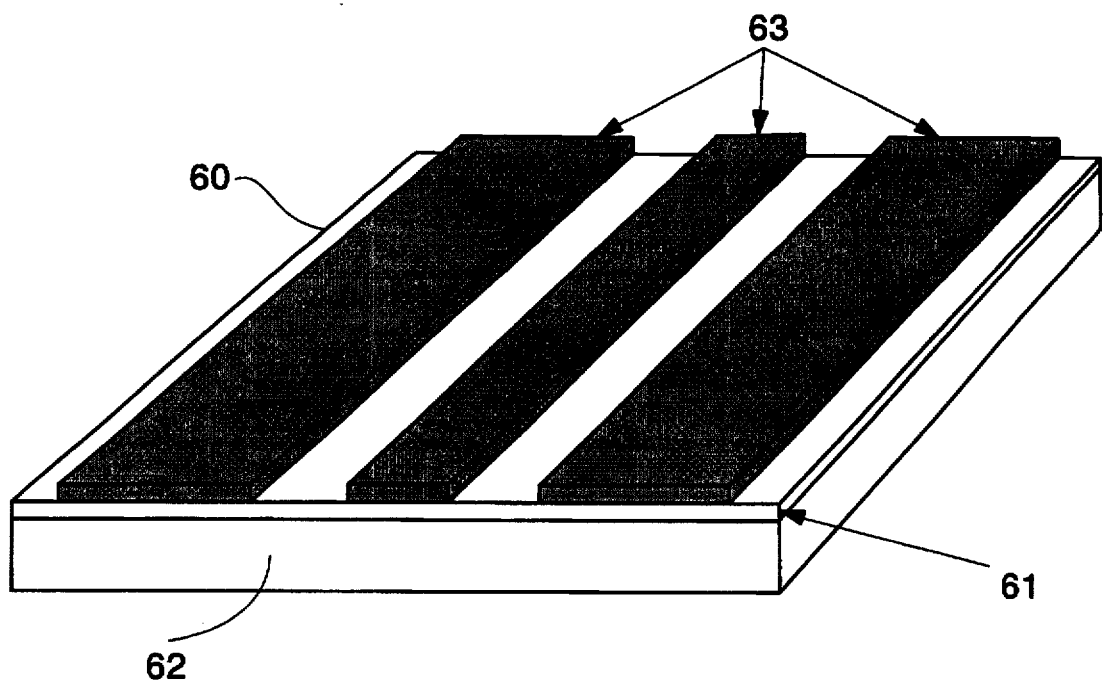
FIG. 9 is a perspective view of a coplanar structure of the invention formed on a $LaAlO_3$ substrate.

A coplanar structure 60 in accordance with the invention is shown in FIG. 9. Structure 60 includes ferroelectric film 61 overlying LaAlO$_3$ substrate 62. Thin films 63 of HTSC (e.g., YBCO or TBCCO) material are deposited on film 61 of ferroelectric dielectric material such as barium strontium titanate (BST) material, the lower surface of which is contiguous with the upper surface of the substrate of a LaAlO$_3$ (LAO) material.

Figure 10:
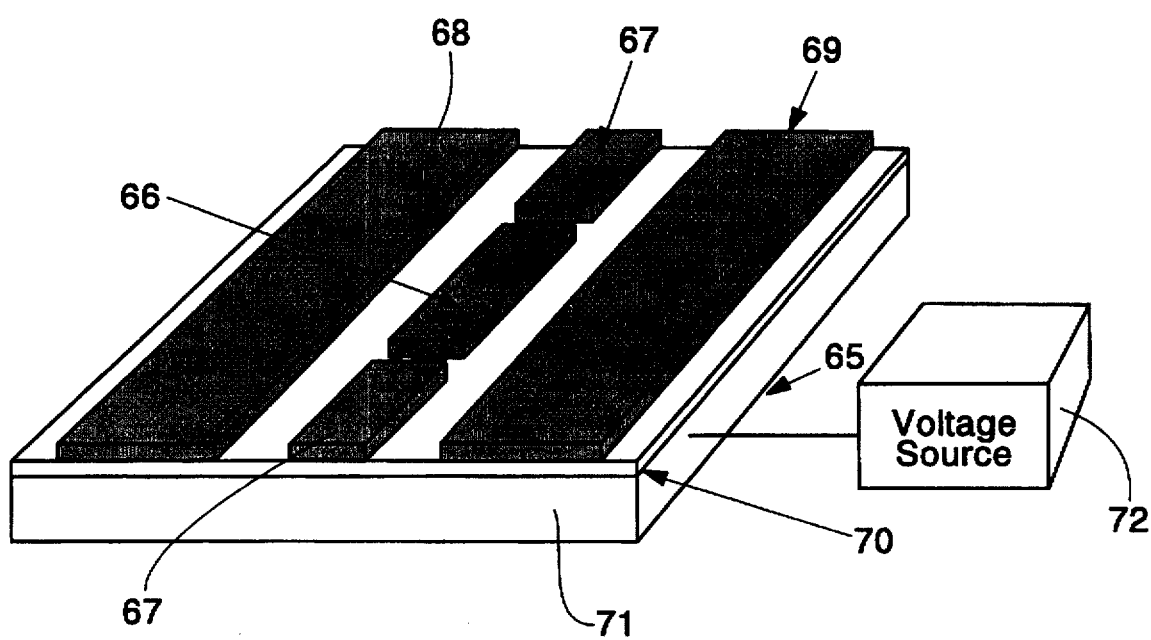
FIG. 10 is a perspective view of a resonant cavity formed by coplanar cavities in accordance with the invention.

FIG. 10 shows a tuneable coplanar structure 15 having a center coplanar lines 66 and 67 of YBCO material forming a half wave-length resonator with coplanar lines 66 and 67 being disposed between coplanar lines 68 and 69. The lines 66–69 are deposited on a dielectric film 70 of BST material. Changes in the thickness of the substrate 71 which, for example, can be LaAlO$_3$ material, modify the effective dielectric constant of film 70 of BST material and the percentage change of this dielectric constant with the variable voltage applied to dielectric film, 71 by voltage source 72.

Figure 11:
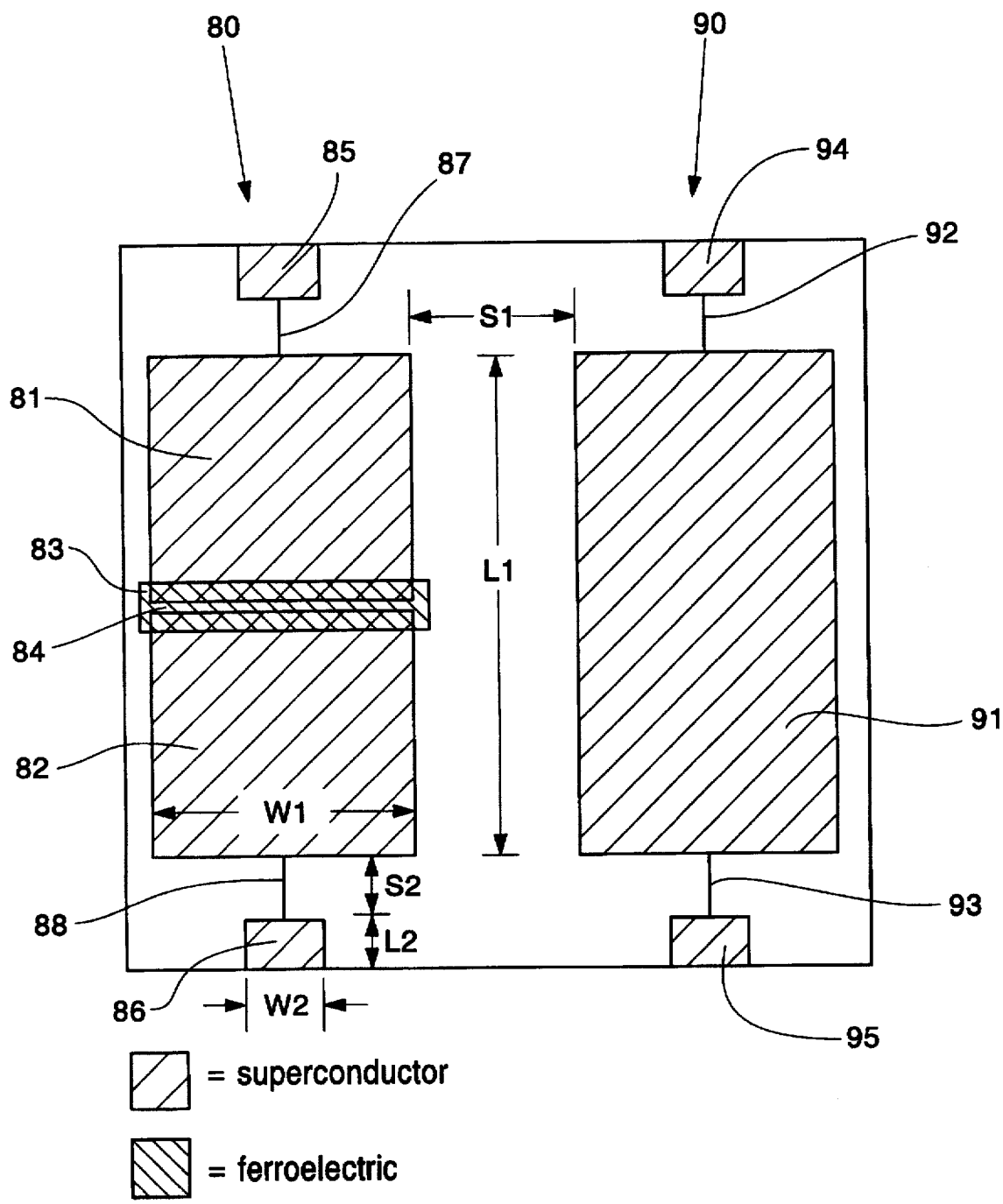
FIG. 11 is a schematic representation of a capacitively coupled microstrip line resonator with a tuneable ferroelectric capacitor and a capacitively coupled microstrip line resonator without tunability.

FIG. 11 shows an capacitively coupled microstrip resonator 80. The dimensions shown on FIG. 11 are by way of example. The resonator includes microstrips 81 and 82 of superconductor (HTSC) material which, by way of example, extend for 9 mm and, by way of example, have a width of 3.73 mm. Strip 83 of thin film ferroelectric material extends over the gap between strips 81 and 82. Strips 85 and 86 of HTSC material are connected by leads 87 and 88, respectively, to strips 81 and 82, respectively. Strips 85 and 86, by way of example, each can have an area of 1 mm by 1.27 mm and each can be disposed, from microstrips 81 and 82, respectively. The spacing between strips 85 and 86, by way of example, can be 13 mm. If the resonator 80 of FIG. 11, by way of example, is deposited on 17 mils of LaAlO$_3$ (LAO) material with $\epsilon_r$=24.5, then the effective dielectric constant, $\epsilon_{eff}$ is $\epsilon_{eff}$≃20.

Inductively coupled resonator 90 in FIG. 11 having no tunability includes strip 91 of HTSC material connected by leads 92 and 93 to strips 94 and 95 of HTSC material, respectively. Concerning the dimensions shown in FIG. 11, S1 refers to the distance between the microstrips 81 and 82 of superconductor material and the strip 91; S2 refers to the distance from the lower end of the microstrip 82 to the upper end of the strip 86; L1 refers to the combined length of the microstrips 81 and 82 and the length of the strip 91; L2 refers to the length of the strip 86; W1 refers to the width of the microstrips 81 and 82; and W2 refers to the width of the strip 86. If the untuneable resonator 90 is approximated as a section of transmission line comprising two parallel spaced conductors with open ends, then its resonant frequencies is:

$$f_n = \frac{c}{\sqrt{\epsilon_{eff}}} \times \frac{n}{2l}$$

f=resonant frequency of two parallel spaced conductors,
c=the speed of light
$\epsilon_{eff}$=effective dielectric constant
n=a constant
l=spacing between parallel spaced conductors where, for example, l=9 mm, n=1,2,3

This gives f≈3.7 GHz, 7.4 GHz, 11.2 GHz, etc.

The thin film ferroelectric strip 83 in series with strips 81 and 82 form a ferroelectric capacitor 84 in the tuneable resonator 80 will affect those resonant modes with large currents in the region of the ferroelectric capacitor. These are the antisymmetric resonant modes, i.e., modes with odd "n" in the above equation. Transmission line analysis yields a transcendental equation for the increased resonant frequencies of these modes:

$$-\frac{1}{\tan K \frac{l}{2}} = \frac{1}{2\pi Z_0 \frac{C}{2}}$$

where

C=capacitance $Z_0$=characteristic impendance≃7 l=effective length of the resonator (open end to open end length)

k=

$$k = \frac{2\pi f c}{\sqrt{\epsilon_{eff}}} \text{ for TEM mode,}$$

for TEM mode,
where c is the speed of light and f is the frequency of the resonant mode.

It is estimated that the capacitance is C~1 pF. This gives a resonant frequency spectrum of:

6.7 GHz, 7.4 GHz, 13.43 GHz, . . .
Under a DC bias, the 6.7 Ghz, 13.43 Ghz, . . . modes will increase in frequency due to the voltage tuneable dielectric constant change.

Figure 12:
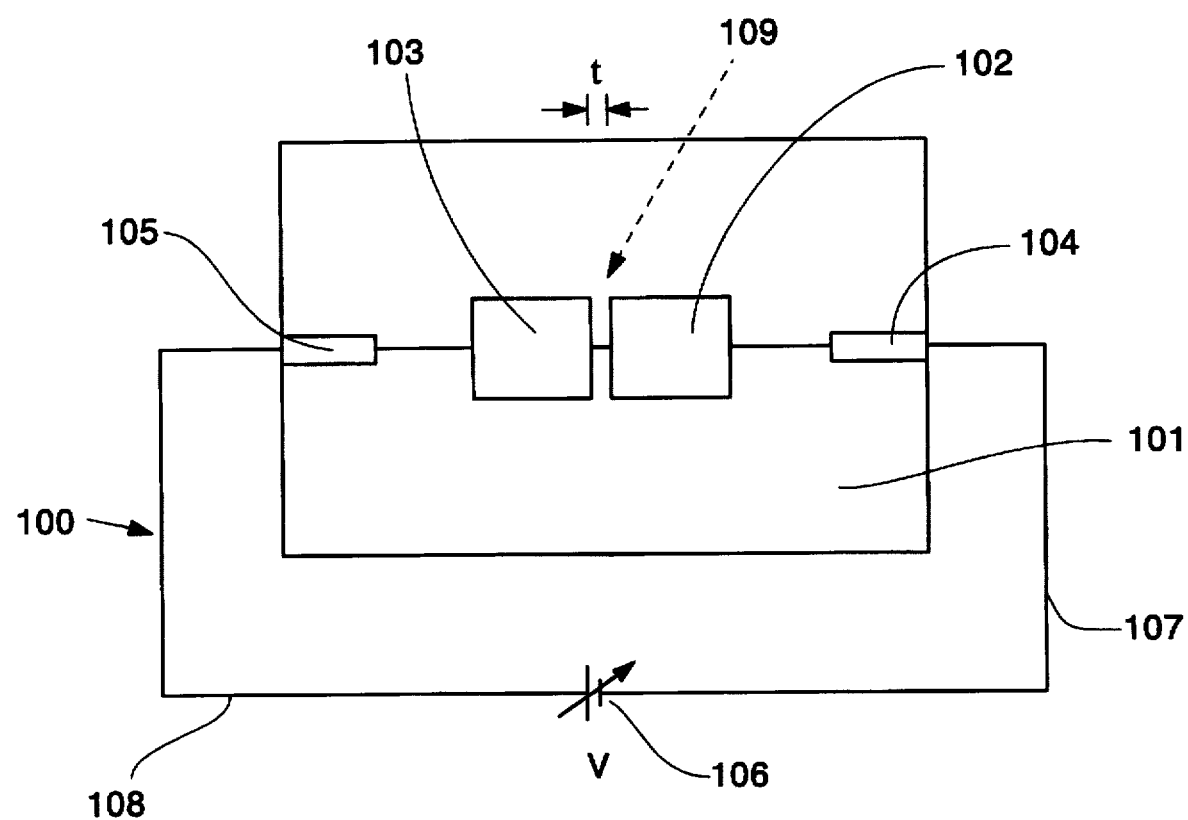
FIG. 12 is a plan view of a superconducting fringe effect capacitor in accordance with the invention.
Figure 13:
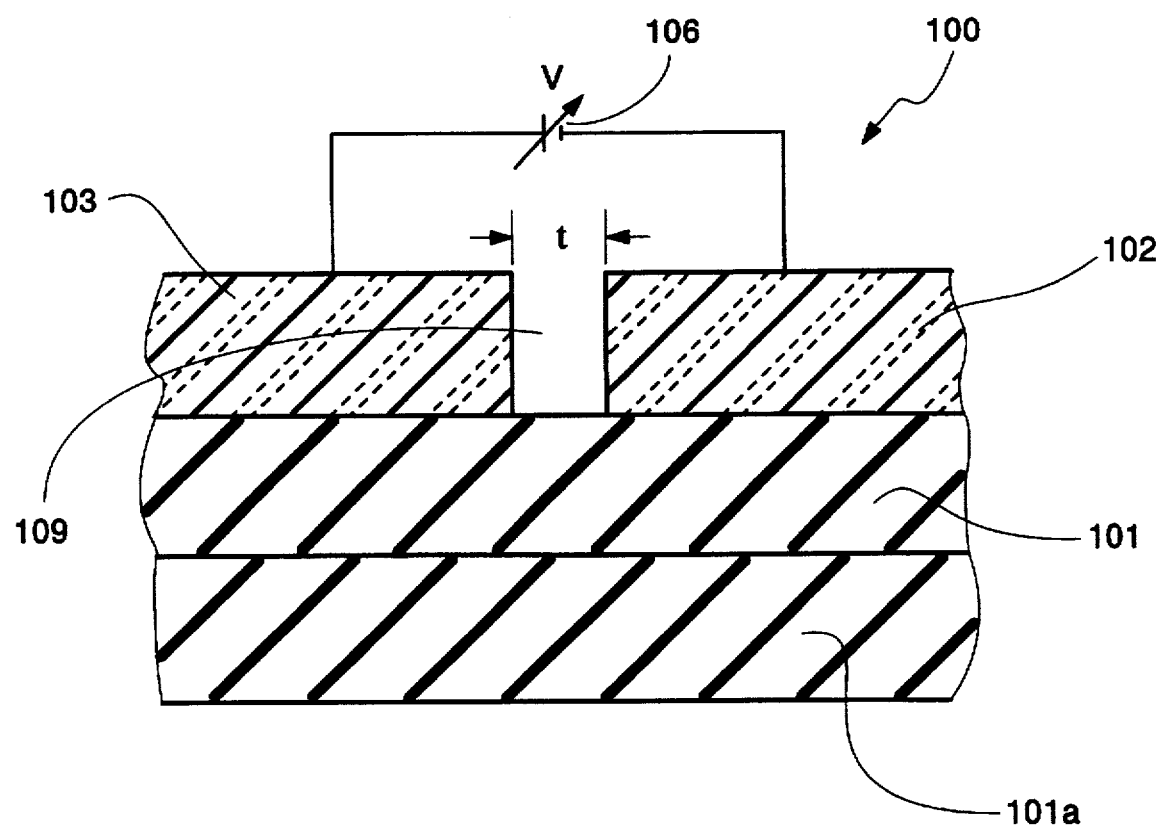
FIG. 13 is an elevation view of the capacitor of FIG. 12.

In FIGS. 12 and 13 there is shown a superconducting fringe effect capacitor 100 comprising a thin film of ferroelectric material 101 disposed on a substrate 101a (see FIG. 13). Thin films 102 and 103 of HTSC material are deposited on ferroelectric thin film 101. Pads 104 and 105 (see FIG. 13) are connected by leads 107 and 108, respectively, to thin films 102 and 103, respectively. Variable voltage source 106 is connected by lead 107 and 108 (see FIG. 12) to pads 104 and 105, respectively, and thereby across thin films 102 and 103. The thin film of ferroelectric material 101 has a fringe effect capacitance region 109 of a width "t" disposed between thin films 102 and 103 of HTSC material. By applying a variable voltage across the thin films 102 and 103, the dielectric constant of the ferroelectric material 101 can be tuned.

Figure 14:
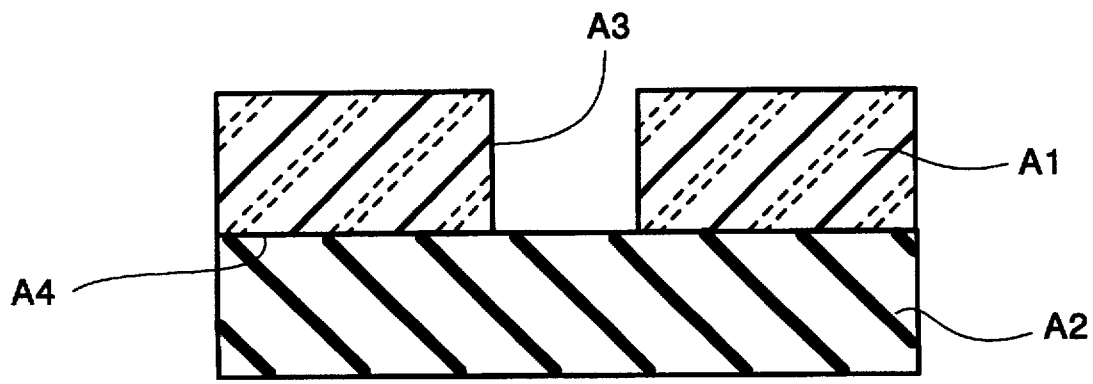
FIG. 14 is a cross sectional view of a specific multilayer structure of the invention, with a HTSC layer on top of a ferroelectric layer.

As shown in FIG. 14, a HTSC layer A1 is deposited on a ferroelectric layer A2, and the HTSC layer can be subsequently patterned to produce a variety of structures A3. In this geometry, the HTSC/ferroelectric interface A4 is perpendicular to the C-axis of the layers, and lies in the plane of the layers.

Figure 15:
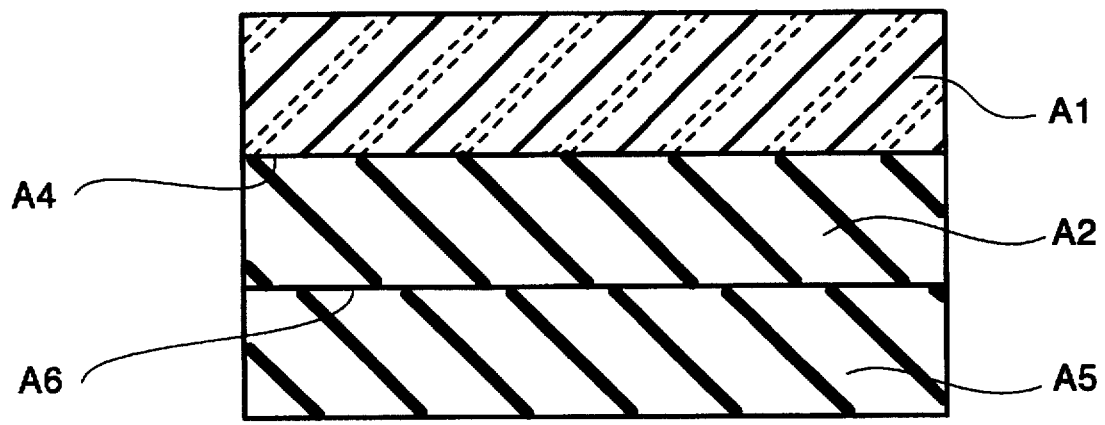
FIG. 15 is a cross sectional view of a more general multilayer structure of the invention, with a HTSC layer on top of a ferroelectric layer on top of a substrate.

As shown in FIG. 15, a HTSC layer A1 is deposited on a ferroelectric layer A2 which is deposited on a substrate A5. Again, the HTSC/ferroelectric interface A4, and the ferroelectric/substrate interface A6 lie in the plane of the layers.

Figure 16:
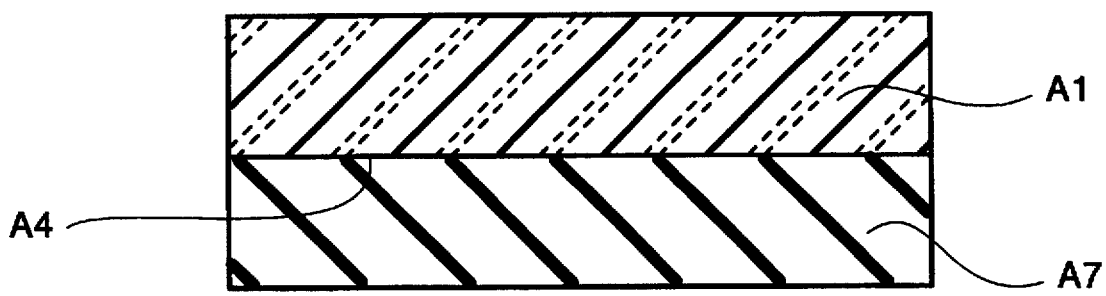
FIG. 16 is a cross sectional view of a specific structure of the invention, in which a HTSC layer is deposited directly on a ferroelectric substrate.

As shown in FIG. 16, a HTSC layer A1 is deposited directly on a ferroelectric substrate A7, with the HTSC/ferroelectric interface A4 being coincident with the HTSC/substrate interface, again lying in the plane of the layers.

Figure 17:
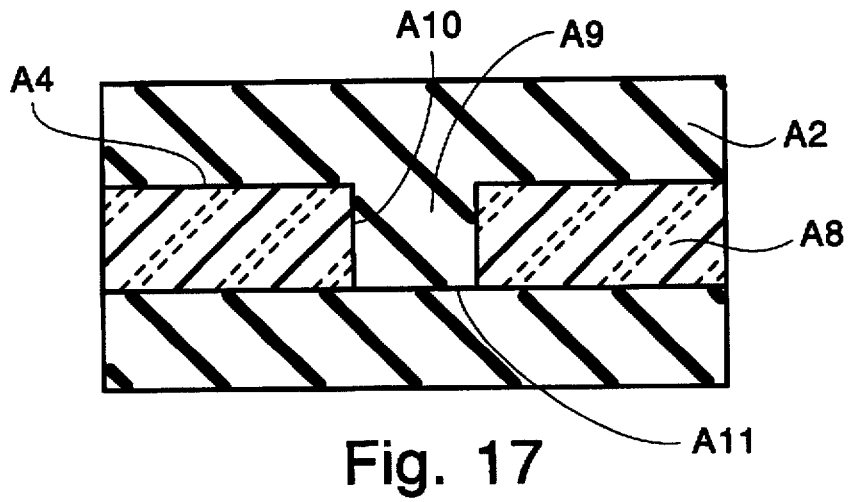
FIG. 17 is a cross sectional view of a specific multilayer structure of the invention, with a ferroelectric layer deposited on top of a patterned HTSC layer (deposited on a substrate) with the ferroelectric layer also filling in the etched regions of the HTSC layer.

As shown in FIG. 17, a ferroelectric layer A2 is deposited on top of a patterned HTSC layer AS (with example etched feature A9 shown), which is deposited on a substrate A7. The ferroelectric layer A9 fills the etched regions A9 and forms HTSC/ferroelectric interfaces A4 between the overlying ferroelectric layer A2 and HTSC layer AS and interfaces A10 between the ferroelectric layer A2 and the edges of the patterned HTSC film AS. The interface A11 between the ferroelectric film A2 and the crystalline (or film) substrate A7 (made of dielectric, insulator, ferroelectric, or other material) is also shown.

Figure 18:
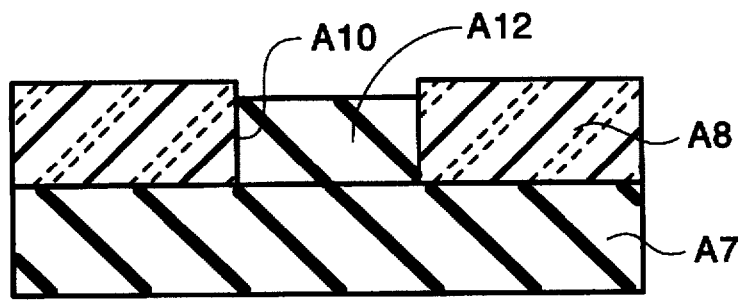
FIG. 18 is a cross section view of a specific structure of the invention in which a ferroelectric layer and HTSC layer lie in the same plane, with the HTSC-ferroelectric interface of the invention being at the edges of the films.

As shown in FIG. 18, a ferroelectric layer A12 and HTSC layer A8 are deposited in the same plane, with the HTSC/ferroelectric interface A10 lying at the edges of the layers. Such layers can be deposited on a variety of substrates A7.

Figure 19:
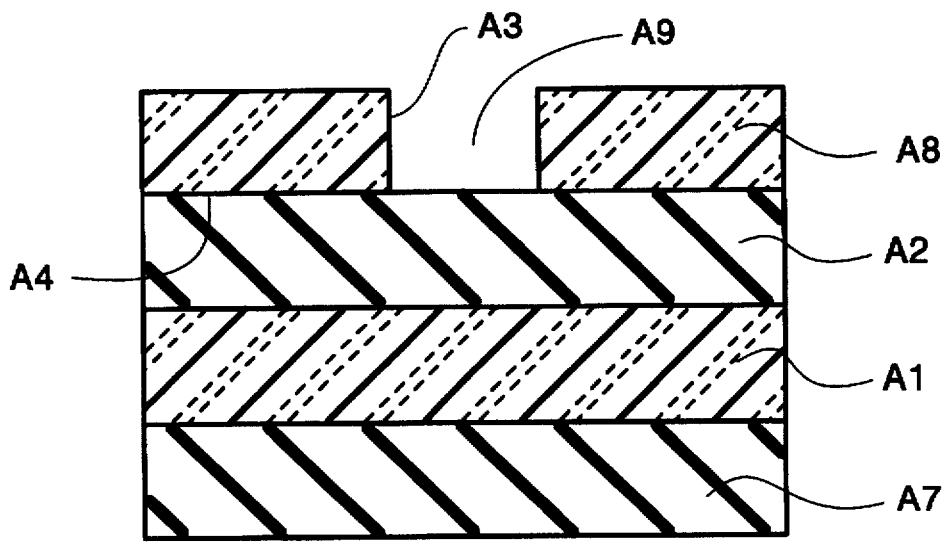
FIG. 19 is a cross sectional view of a general multilayer structure of the invention with various combinations of HTSC and ferroelectric layers on a bulk crystalline dielectric, insulating, or ferroelectric substrate.

As shown in FIG. 19, a variety of structures A1–A9 are shown in combination, representing one example of the more general multi-layer structure of the invention, with various patterned A3 and A8 and unpatterned HTSC A1 and ferroelectric layers lying on top of each other, in various orders, and with the entire structure lying on a substrate A7. In the general structure, the substrate could be made of a bulk crystalline sample or film of any number of materials, including dielectrics, insulators, ferroelectrics, etc.

All the layers described can be deposited by a variety of techniques, including physical vapor deposition, chemical vapor deposition, laser deposition, sputtering, sol gel, etc.

Figure 20:
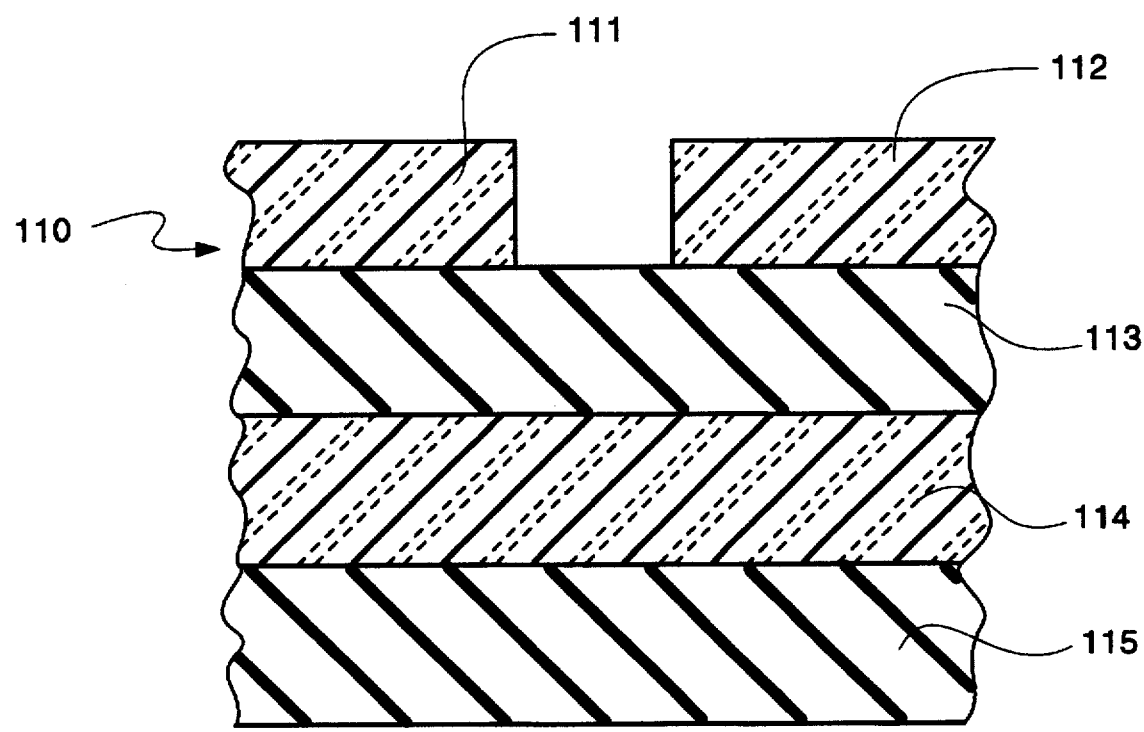
FIG. 20 is a fragmentary vertical section view of coplanar thin films of HTSC material contiguous with one surface of a thin film of ferroelectric material and a thin film of HTSC material contiguous with the other surface of the thin film of ferroelectric material.

In FIG. 20 there is shown a multilayer component 110 of the invention comprising thin films 111 and 112 of HTSC material contiguous with thin film 113 of ferroelectric material. The lower surface of ferroelectric thin film is contiguous with the upper surface of thin film 114 of HTSC material. The lower surface of thin film 114 is contiguous with the upper surface of substrate 115.

Figure 21:
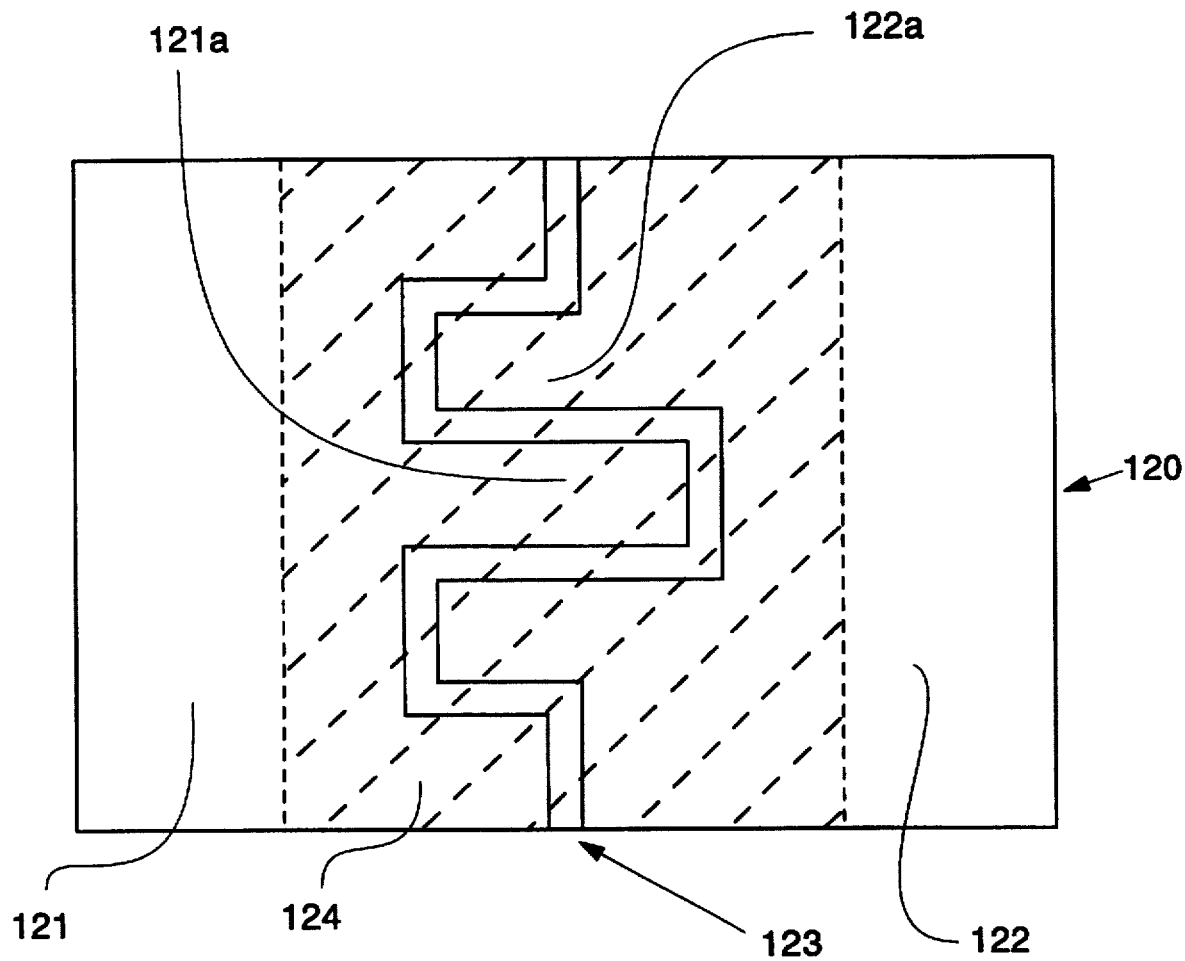
FIG. 21 is a plan view of an interdigitated capacitor of the invention.
Figure 22:
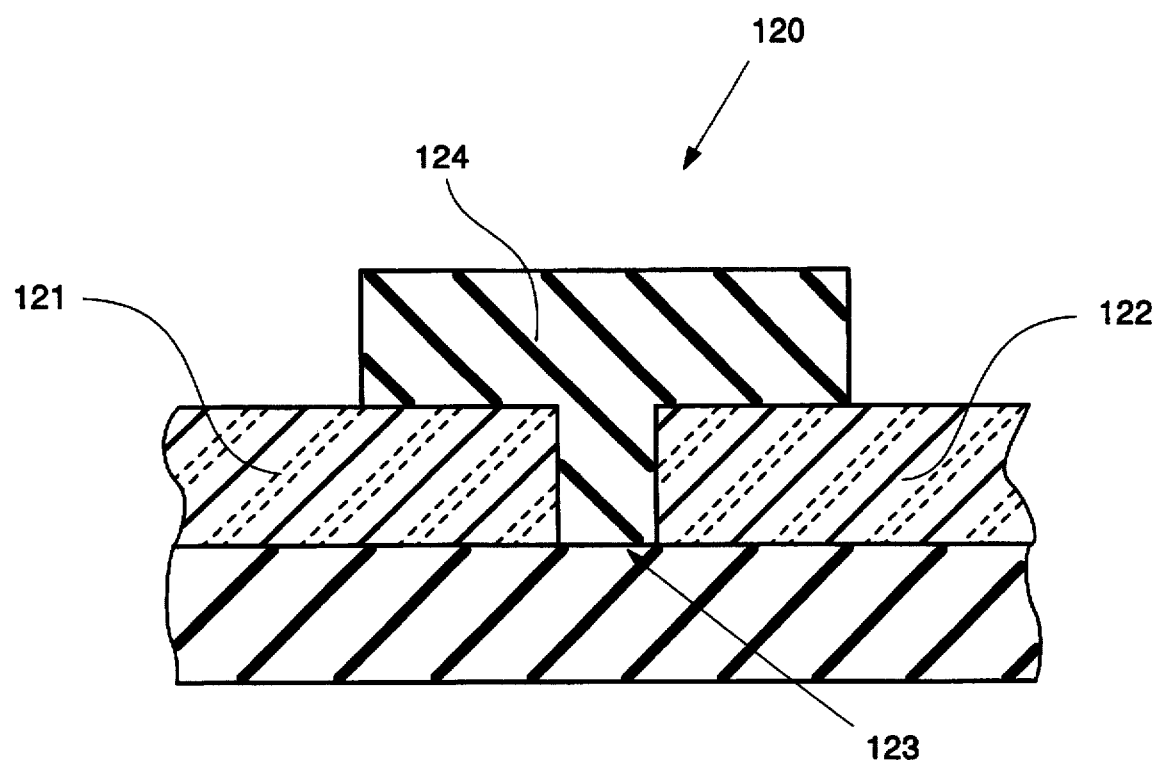
FIG. 22 is a fragmentary vertical section view of the interdigitated capacitor of FIG. 21.

FIG. 21 is a plan view of an interdigitated capacitor structure 120 in accordance with the invention. Thin films 121 and 122 of HTSC material have a plurality of projections 121a and 122a, respectively, which nest with respect to one another, thereby forming a meandering slot 123 in structure 120. As shown in FIGS. 21 and 22, a thin film 124 of ferroelectric material overlies the portions of thin films 121 and 122 adjacent meandering slot 123 and extends into the slot itself. The structure 120 enables the overall value of the capacitance of structure 120 to be increased while maintaining tuneability of the capacitance by the application of predetermined voltages to thin film 124.

Figure 23:
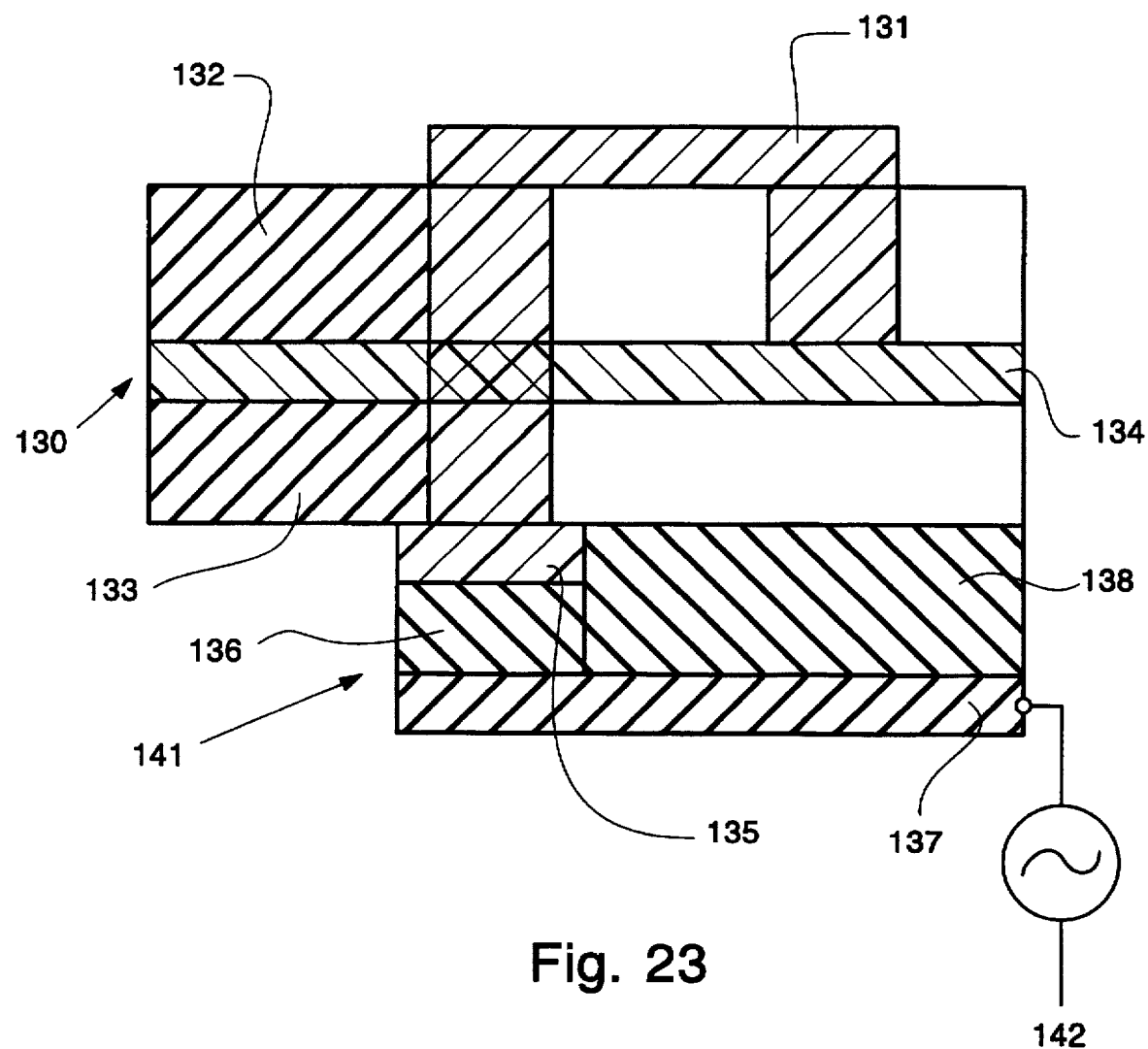
FIG. 23 is a plan view of a half-loop antenna of the invention.

FIG. 23 shows a tuneable antenna 130 in accordance with the invention. The tuneable antenna comprises half-loop 131 of a thin film of HTSC material. Layers of insulating material 132 and 133 support the half-loop antenna 131. Layers 132 and 133 are separated by thin film 134 of HTSC material. Thin film 135 of HTSC material is connected to half-loop 131. Thin film 136 of ferroelectric material is disposed between thin film 135 and thin film 140 of HTSC material which is disposed on substrate 138. Thin films 135 and 140 with ferroelectric thin film 136 therebetween form tuneable capacitor 141.

Figure 24:
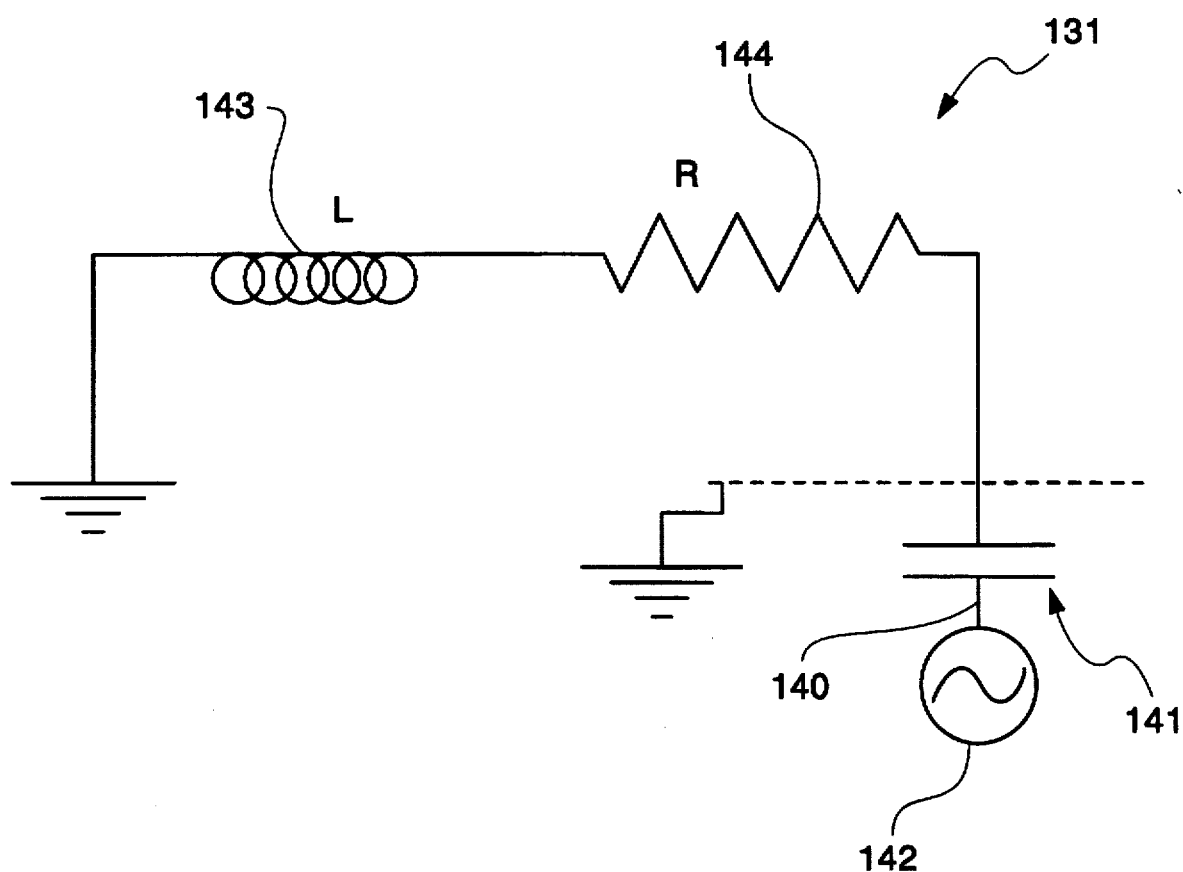
FIG. 24 is a schematic representation of the resonant circuit of the interdigitated capacitor of FIG. 21.

In FIG. 24 there is shown the equivalent circuit of the half-loop antenna 130 of FIG. 23. Driving signal source 142 is connected to the half loop antenna element 131 via the tuneable capacitor 141. Driving signal source 142 is connected to thin film 140. As shown in FIG. 24, inductance 143 and resistance 144 are the lumped values of the resistance R and the inductance L of the half-loop antenna. The application of a DC voltage across capacitor 141 tunes the capacitance thereof and hence the frequency of the resonance of the circuit comprising the half-loop antenna 131 and the capacitor 141.

The advantages of the present invention, as well as certain changes and modifications of the disclosed embodiments thereof, will be readily apparent to those skilled in the art. It is the applicants' intention to cover in their claims all those changes and modifications which could be made to the embodiments of the invention herein chosen for the purpose of the disclosure without departing from the spirit and scope of the invention.

What is claimed is:

1. A tuneable fringe effect capacitor for conducting radio frequency energy comprising a thin film of ferroelectric material having a dielectric constant which is a function of a voltage applied thereto, a pair of conductive layers for conducting radio frequency energy separated by a gap, the thin film of ferroelectric material being disposed in the gap between the conductive layers to provide a first conductive path for the radio frequency energy, and an electrically insulating substrate supporting the conductive layers and the thin film of ferroelectric material, the conductive layers and substrate providing a second conductive path for the radio frequency energy, the gap between the pair of conductive layers ferroelectric capacitance across the film of ferroelectric material disposed in the first conductive path and a substrate capacitance across a portion of the substrate disposed in the second conductive path whereby, when radio frequency energy propagates through the tuneable fringe effect capacitor, a first portion of the radio frequency energy propagates along the first conductive path and a second portion of the radio frequency energy propagates along the second conductive path such that the substrate capacitance and the ferroelectric capacitance are electrically connected in parallel.

2. A tuneable fringe effect capacitor in accordance with claim 1, and further comprising means for applying the voltage across the pair of conductive layers and thereby through the ferroelectric film in the gap between the conductive layers to affect the dielectric constant of the ferroelectric film and thereby a capacitance value associated with the capacitor.

3. A tuneable fringe effect capacitor in accordance with claim 1 wherein the voltage is a variable dc voltage and further comprising means for applying the variable dc voltage across the conductive layers and thereby through the ferroelectric film in the gap between the conductive layers to vary the dielectric constant of the ferroelectric film and thereby a capacitance value associated with the capacitor.

4. A tuneable fringe effect capacitor in accordance with claim 1 in which the gap is defined by a plurality of projections extending respectively from each of the pair of conductive layers and nested with respect to one another, with the film of ferroelectric material in the gap delineated by the nested projections located between the pair of layers of conductive material.

5. A tuneable fringe effect capacitor in accordance with claim 4 and further comprising means for applying the voltage across the pair of conductive layers and thereby through the ferroelectric film in the gap between the pair of conductive layers to affect the dielectric constant of the ferroelectric film and thereby a capacitance value associated with the capacitor.

6. A tuneable fringe effect capacitor in accordance with claim 4 wherein a surface of the ferroelectric film is contiguous with a surface of the substrate.

7. A tuneable fringe effect capacitor in accordance with claim 4 in which the thin film of ferroelectric material having a dielectric constant which is a function of the voltage applied thereto has a portion thereof extending into the gap between the pair of layers of conductive material.

8. A tuneable conducting fringe effect capacitor in accordance with claim 1 wherein the capacitor has a capacitance value of approximately 1 pf.

9. A tuneable fringe effect capacitor in accordance with claim 1 wherein the dielectric constant of the thin film ferroelectric material is a function of the voltage applied thereto and the radio frequency energy is one of microwave and millimeter wave energy.

10. A tuneable fringe effect capacitor in accordance with claim 1 wherein the thin film of ferroelectric material has a thickness and the thickness ranges from 100 to 10,000 angstroms.

11. A tuneable fringe effect capacitor in accordance with claim 1 wherein said conductive material is a superconductive material.

12. A tuneable fringe effect capacitor for transmitting radio frequency energy comprising a thin film ferroelectric material having a dielectric constant that is a function of a voltage applied thereto, a pair of conductive films in contact with the ferroelectric material with a gap between the conductive films, the thin film ferroelectric material being disposed in the gap between the conductive films to provide a first conductive path for the radio frequency energy, and a substrate supporting the thin film ferroelectric material and said pair of conductive films, the conductive films and substrate providing a second conductive path for the radio frequency energy, the gap between the pair of conductive films providing a ferroelectric capacitance across the thin film ferroelectric material disposed in the first conductive path and a substrate capacitance across a portion of the substrate disposed in the second conductive path, wherein the pair of conductive films are adjacent to a common surface of the substrate and, when radio frequency energy propagates through the tuneable fringe effect capacitor, a first portion of the radio frequency energy propagates along the first conductive path and a second portion of the radio frequency energy propagates along the second conductive path such that the substrate produces the substrate capacitance in response to the radio frequency energy and the ferroelectric material produces the ferroelectric capacitance in response to the radio frequency energy and the substrate capacitance and ferroelectric capacitance are electrically connected in parallel.

13. A tuneable fringe effect capacitor in accordance with claim 1 wherein the gap is defined by a plurality of projections extending respectively from the pair of conductive films and nested with respect to one another, with the thin film ferroelectric material in the gap delineated by the nested projections located between the films of conductive material.

14. A tuneable fringe effect capacitor in accordance with claim 13 wherein a surface of the thin film ferroelectric material is disposed opposite to and is contiguous with the common surface of the substrate and the pair of conductive films is adjacent to the surface of the thin film ferroelectric material.

15. A tuneable fringe effect capacitor accordance with claim 12 wherein the pair of conductive films are located on a common surface of the thin film ferroelectric material.

16. A tuneable fringe effect capacitor in accordance with claim 1 wherein said substrate is an electrically insulating material.

17. A tuneable fringe effect capacitor in accordance with claim 12 wherein the dielectric constant of the thin film ferroelectric material is a function of the voltage applied thereto and the frequency of the radio frequency energy has a value that is at least that of the frequency of microwave energy.

18. A tuneable fringe effect capacitor in accordance with claim 17 wherein the thin film ferroelectric material has a thickness ranging from 100 to 10,000 angstroms.

19. A tuneable fringe effect capacitor in accordance with claim 12 wherein the thin film ferroelectric material and the pair of conductive films are located on the common surface of the substrate.

20. A tuneable fringe effect capacitor for transmitting radio frequency energy comprising a thin film of a dielectric material having a dielectric constant which is a function of a voltage applied thereto, variable voltage means for applying a variable voltage to the thin film dielectric material, a pair of coplanar conductive films with a gap therebetween, and an electrically insulating substrate supporting the thin film of dielectric material and the pair of coplanar conductive films wherein the thin film of dielectric material is disposed in the gap between the conductive films to provide a first conductive path for the radio frequency energy and the conductive films and a portion of the substrate disposed in the gap provide a second conductive path for the radio frequency energy, the gap being free of a conductive material above the electrically insulating substrate and below the thin film of dielectric material and providing a dielectric capacitance across the film of dielectric material disposed in the first conductive path and a substrate capacitance across the portion of the substrate disposed in the second conductive path, the conductive films and thin film dielectric material being located on a common surface of the substrate whereby, when radio energy propagates through the tuneable fringe effect capacitor, a first portion of the radio frequency energy propagates along the first conductive path and a second portion of the radio frequency energy propagates along the second conductive path such that the substrate capacitance and the dielectric capacitance are electrically connected in parallel and wherein, the radio frequency energy has a frequency that has a value that is at least that of the frequency of microwave energy.

21. A tuneable fringe effect capacitor in accordance with claim 20, wherein the substrate has a substrate dielectric constant and the substrate dielectric constant is independent of a voltage applied to the substrate.

22. A tuneable fringe effect capacitor in accordance with claim 21, wherein the substrate dielectric constant is less than the dielectric constant of the thin film dielectric material.

23. A tuneable fringe effect capacitor in accordance with claim 26, wherein the thin film dielectric material is a thin film ferroelectric material.

\* \* \* \* \*

UNITED STATES PATENT AND TRADEMARK OFFICE
CERTIFICATE OF CORRECTION

PATENT NO. : 5,721,194
DATED : February 24, 1998
INVENTOR(S) : Yandrofski et al.

It is certified that error appears in the above-identified patent and that said Letters Patent is hereby corrected as shown below:

In Claim 1, column 12, line 38, after the word "layers" insert --providing a--.

UNITED STATES PATENT AND TRADEMARK OFFICE
CERTIFICATE OF CORRECTION

PATENT NO. : 5,721,194
DATED : February 24, 1998
INVENTOR(S) : Yandrofski et al.

It is certified that error appears in the above-identified patent and that said Letters Patent is hereby corrected as shown below:

In Claim 13, column 13, line 62, after the word "claim" delete "1" and insert --12--

In Claim 15, column 14, line 7, after the word "capacitor" insert --in--

In Claim 16, column 14, line 11, after the word "claim" delete "1" and insert --12--

In Claim 23, column 14, line 65, after the word "claim" delete "26" and insert --20--

Signed and Sealed this

First Day of February, 2000

*Attest:*

Q. TODD DICKINSON

*Attesting Officer*     *Acting Commissioner of Patents and Trademarks*